(12) United States Patent
Nakagawa et al.

(10) Patent No.: US 11,935,998 B2
(45) Date of Patent: Mar. 19, 2024

(54) BATTERY DEVICE

(71) Applicant: Nissan Motor Co., Ltd., Yokohama (JP)

(72) Inventors: Takamasa Nakagawa, Kanagawa (JP); Takeshi Nakano, Kanagawa (JP); Hiroyuki Tanaka, Kanagawa (JP); Yusuke Nakashima, Kyoto (JP); Naofumi Shoji, Kyoto (JP)

(73) Assignee: Nissan Motor Co., Ltd., Yokohama (JP)

( * ) Notice: Subject to any disclaimer, the term of this patent is extended or adjusted under 35 U.S.C. 154(b) by 661 days.

(21) Appl. No.: 17/059,833

(22) PCT Filed: May 22, 2019

(86) PCT No.: PCT/JP2019/020344
§ 371 (c)(1),
(2) Date: Nov. 30, 2020

(87) PCT Pub. No.: WO2019/230536
PCT Pub. Date: Dec. 5, 2019

(65) Prior Publication Data
US 2021/0218049 A1    Jul. 15, 2021

(30) Foreign Application Priority Data
Jun. 1, 2018   (JP) ................ 2018-105977

(51) Int. Cl.
*H01M 10/04*       (2006.01)
*H01M 10/0566*     (2010.01)
(Continued)

(52) U.S. Cl.
CPC ... *H01M 10/0468* (2013.01); *H01M 10/0585* (2013.01); *H01M 10/0486* (2013.01);
(Continued)

(58) Field of Classification Search
CPC ......... H01M 10/0468; H01M 10/0585; H01M 10/0566; H01M 10/0486; H01M 10/0436;
(Continued)

(56) References Cited

U.S. PATENT DOCUMENTS

2001/0006746 A1*  7/2001  Kageyama .......... H01M 50/103
                                                    429/61
2016/0043401 A1   2/2016  Yamaguchi et al.
(Continued)

FOREIGN PATENT DOCUMENTS

| JP | 2001-167745 A | 6/2001 |
| JP | 2003123845    | * 4/2003 |

(Continued)

OTHER PUBLICATIONS

Extended European Search Report of corresponding application EP19811557.8; dated Aug. 5, 2021; 7 pages.

*Primary Examiner* — Matthew W Van Oudenaren
(74) *Attorney, Agent, or Firm* — Young Basile Hanlon & MacFarlane, P.C.

(57) ABSTRACT

A battery device comprises a nonaqueous electrolyte secondary battery provided with an electric power generating element and a pressing member which presses the electric power generating element in the stacking direction. The electric power generating element comprises: a positive electrode with a positive electrode active material layer of a positive electrode active material on the surface of a positive electrode collector; a negative electrode with a negative electrode active material layer of a negative electrode active material on the surface of a negative electrode collector; and a separator which holds an electrolyte solution. This battery device satisfies (1) $0.1 < (T1-T2)/T1 \times 100 < 5$, where T1 is the thickness of the thickest portion of the electric power generating element in the stacking direction, and T2 is the (Continued)

thickness of the thinnest portion of the of the electric power generating element in the stacking direction.

3 Claims, 4 Drawing Sheets

(51) Int. Cl.
*H01M 10/0585* (2010.01)
*H01M 50/209* (2021.01)
*H01M 50/211* (2021.01)
*H01M 50/238* (2021.01)
*H01M 50/242* (2021.01)

(52) U.S. Cl.
CPC ...... *H01M 10/0566* (2013.01); *H01M 50/209* (2021.01); *H01M 50/211* (2021.01); *H01M 50/238* (2021.01); *H01M 50/242* (2021.01); *H01M 2220/20* (2013.01)

(58) Field of Classification Search
CPC ............. H01M 50/209; H01M 50/211; H01M 50/238; H01M 50/242
See application file for complete search history.

(56) References Cited

U.S. PATENT DOCUMENTS

2017/0237116 A1* 8/2017 Shindo ................. H01M 4/624
429/127
2018/0048023 A1 2/2018 Ohsawa et al.

FOREIGN PATENT DOCUMENTS

| | | |
|---|---|---|
| JP | 2003123845 A | 4/2003 |
| JP | 2017-147222 A | 8/2017 |
| JP | 2018-049708 A | 3/2018 |
| WO | 2014/157419 A1 | 10/2014 |

* cited by examiner

BATTERY DEVICE

CROSS-REFERENCE TO RELATED APPLICATION(S)

This application is a 371 national stage application of PCT/JP2019/020344, filed May 22, 2019, which claims priority to Japanese Patent Application No. 2018-105977, filed Jun. 1, 2018, the disclosure of which is incorporated herein in its entirety by reference.

TECHNICAL FIELD

The present invention relates to a battery device.

BACKGROUND ART

In recent years, there has been an eager demand fora reduction in carbon dioxide emissions in order to cope with global warming. In the automobile industry, expectations are building for a reduction in the carbon dioxide emissions brought by introduction of electric vehicles (EV) and hybrid electric vehicles (HEV), and development of non-aqueous electrolyte secondary batteries such as motor driving secondary batteries, which hold the key to the practical application of these vehicles, is being actively conducted.

Motor driving secondary batteries are required to have very high power output characteristics and high energy compared to lithium ion secondary batteries for consumer use, which are used for mobile telephones, laptop computers, and the like. Therefore, attention is focused on lithium ion secondary batteries having the highest theoretical energy among all practical batteries, and currently, development is in rapid progress.

A non-aqueous electrolyte secondary battery such as a lithium ion secondary battery generally has a configuration in which a power generating element in which a positive electrode obtained by applying a positive electrode active material slurry including a positive electrode active material, a binder, and the like on the surface of a positive electrode current collector and drying the slurry, and a negative electrode obtained by applying a negative electrode active material slurry including a negative electrode active material, a binder, and the like on the surface of a negative electrode current collector, are connected with an electrolyte layer (separator retaining an electrolyte) interposed therebetween, is stored in an outer casing body.

Conventionally, there is known a technology of enhancing the characteristics of a device by subjecting a cell laminate structure in which a plurality of cells such as non-aqueous electrolyte secondary batteries are laminated, to pressurization in the direction of lamination of the cells. For example, in JP 2001-167745 A, a technology of pressurizing cells in a direction in which the cells closely adhere to one another, by disposing a disc spring between an end of a casing that accommodates the laminated cells and also covers the respective cross-sections in the direction of lamination, and the laminated cells, is disclosed. According to JP 2001-167745 A, it is considered that by adopting such a configuration, swelling of the cell laminate structure in the direction of lamination can be suppressed, the dimension of the device can be made constant independently of the dimensional error of the laminated cells, and thus handleability is enhanced.

Furthermore, particularly, with regard to non-aqueous electrolyte secondary batteries, it has been a practice to uniformly pressurize cells in the planar direction of the cells. Thereby, the internal resistance of a battery can be lowered by decreasing the inter-electrode distance between the positive electrode and the negative electrode. Furthermore, since local deterioration can also be prevented by allowing electrode reactions to proceed uniformly, it is also possible to enhance the cycle characteristics of a battery.

SUMMARY OF INVENTION

Technical Problem

According to an investigation of the inventors of the present invention, it has been found that, according to a conventional production process for a non-aqueous electrolyte secondary battery using dry electrodes containing a binder, there are occasions in which cracks are generated in an electrode active material layer during a heating process of drying an electrode active material slurry and crystallizing the binder. Cracks in an electrode active material layer can become a cause of significantly deteriorating the battery performance. Thus, the inventors of the present invention conducted an investigation on the use of an electrode in which an electrode active material layer that is not bound (that is, including a non-bound body) by a binder that has been crystallized by heating (hereinafter, also simply referred to as "non-bound active material layer") is disposed on the surface of a current collector, in order to prevent the generation of such cracks.

Since the constituent components of such a non-bound active material layer are not bound by a binder, when compared with a dry electrode bound by a binder, the electrical conductivity in the active material layer tends to decrease. In order to suppress such a decrease in the electrical conductivity, it is after all effective to pressurize cells in the direction of lamination of the cells. However, according to the investigation of the inventors of the present invention, it was found that the internal resistance of the cells in the case of using a non-bound active material layer has sensitivity to the force of pressurization, and the internal resistance of the cells is not sufficiently decreased unless a much greater force of pressurization is applied compared to the case of a dry electrode. Incidentally, in order to apply such a large force of pressurization uniformly in the planar direction of the cells, there is a problem that the pressurizing member for pressurizing the cells should undergo an increase in size, and the energy density as a battery device even including such a pressurizing member is decreased to a large extent.

Thus, it is an object of the present invention to provide, with regard to a non-aqueous electrolyte secondary battery that uses a non-bound active material layer, a means that can decrease the internal resistance of the battery and can also enhance the cycle characteristics of the battery, while minimizing the decrease in the energy density of the battery.

Solution to Problem

The inventors of the present invention conducted a thorough investigation in order to solve the above-described problem. As a result, surprisingly, the inventors found that with regard to a non-aqueous electrolyte secondary battery that uses a non-bound active material layer, the above-described problems are solved by pressurizing a power generating element in the direction of lamination thereof such that the thickness in the direction of lamination of the power generating element will be deliberately varied in the planar direction of the power generating elements, thus completing the present invention.

That is, according to an aspect of the present invention, there is provided a battery device including a non-aqueous electrolyte secondary battery that includes a power generating element including a positive electrode in which a positive electrode active material layer that includes a non-bound body including a positive electrode active material is formed on a surface of a positive electrode current collector, a negative electrode in which a negative electrode active material layer that includes a non-bound body including a negative electrode active material is formed on a surface of a negative electrode current collector, and a separator in which an electrolyte solution is retained; and a pressurizing member that pressurizes the power generating element in a direction of lamination thereof. Further, this battery device has a feature that when a thickness of a thickest portion in the direction of lamination of the power generating element is designated as T1, and a thickness of a thinnest portion is designated as T2, the battery device satisfies the following Mathematical Formula (1):

[Mathematical Formula 1]

$$0.1 < (T1-T2)/T1 \times 100 < 5 \qquad (1)$$

DESCRIPTION OF EMBODIMENTS

Figure 1:
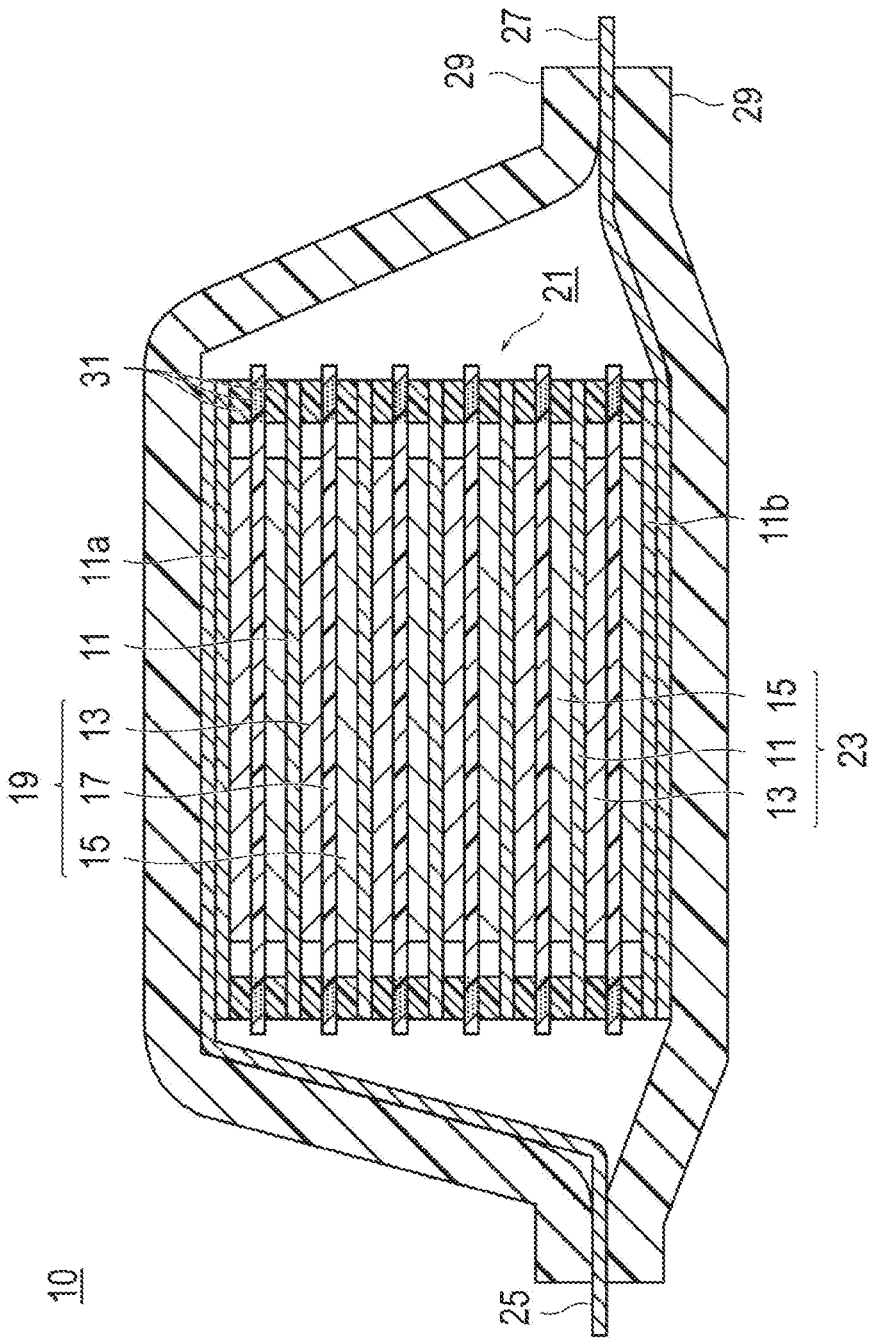
FIG. 1 is a cross-sectional view schematically illustrating a bipolar lithium ion secondary battery as an embodiment of the present invention.

An aspect of the present invention relates to a battery device including a non-aqueous electrolyte secondary battery that includes a power generating element including a positive electrode in which a positive electrode active material layer that includes a non-bound body including a positive electrode active material is formed on the surface of a positive electrode current collector, a negative electrode in which a negative electrode active material layer that includes a non-bound body including a negative electrode active material is formed on the surface of a negative electrode current collector, and a separator in which an electrolyte solution is retained; and a pressurizing member that pressurizes the power generating element in the direction of lamination thereof, wherein when the thickness of the thickest portion in the direction of lamination of the power generating elements is designated as T1, and the thickness of the thinnest portion is designated as T2, the battery device satisfies the following Mathematical Formula (1):

[Mathematical Formula 2]

$$0.1 < (T1-T2)/T1 \times 100 < 5 \qquad (1).$$

According to a battery device having such a configuration, homogenization of pressure inside the active material layer can be promoted as the non-bound active material layer that has been pressurized in the direction of lamination of the power generating elements flows. Therefore, although a large force of pressurization is not uniformly applied to the power generating elements (that is, although a large-sized pressurizing member that brings a decrease in the energy density are not disposed), it is possible to decrease the internal resistance of the battery and to also enhance the cycle characteristics of the battery.

Hereinafter, embodiments of the present invention will be described with reference to the drawings; however, the technical scope of the present invention should be defined based on the description of the claims and is not limited only to the following embodiments. In the following description, the present invention will be explained by taking a bipolar lithium ion secondary battery, which is an embodiment of a non-aqueous electrolyte secondary battery, as an example. Incidentally, the same reference numeral will be assigned to the same elements in the explanation of the drawings, and any overlapping descriptions will not be repeated. Furthermore, the dimensional ratio of a drawing may be exaggerated for the convenience of explanation and may be different from the actual ratio. In the present specification, the expression "X to Y" representing a range means "more than or equal to X and less than or equal to Y". Furthermore, unless particularly stated otherwise, the operations and the measurement of physical properties and the like are carried out under the conditions of room temperature (20° C. to 25° C.)/relative humidity of 40% to 50%.

In the present specification, a bipolar lithium ion secondary battery may be simply referred to as "bipolar secondary battery", and an electrode for a bipolar lithium ion secondary battery may be simply referred to as "bipolar electrode".

<Bipolar Secondary Battery>

FIG. 1 is a cross-sectional view schematically illustrating a bipolar lithium ion secondary battery as an embodiment of the present invention. A bipolar lithium ion secondary battery 10 illustrated in FIG. 1 has a structure in which an approximately square-shaped power generating element 21 where a charging and discharging reaction actually takes place, is encapsulated inside a laminate film 29, which is an outer casing body.

As illustrated in FIG. 1, a power generating element 21 of the bipolar lithium ion secondary battery 10 of the present embodiment has a plurality of bipolar electrodes 23, in each of which a positive electrode active material layer 13 electrically coupled to one surface of a current collector 11 is formed on the surface, and a negative electrode active material layer 15 electrically coupled to the surface on the opposite side of the current collector 11 is formed on the surface. The respective bipolar electrodes 23 are laminated, with a separator 17 (electrolyte layer) interposed therebetween, in which an electrolyte solution is retained, and thus a power generating element 21 is formed. At this time, various bipolar electrodes 23 and a separator 17 are alternately laminated such that a positive electrode active material layer 13 of one bipolar electrode 23 and a negative electrode active material layer 15 of another bipolar electrode 23 adjacent to the one bipolar electrode 23 face each other, with a separator 17 interposed therebetween. That is, a separator 17 is disposed to be sandwiched between a positive electrode active material layer 13 of one bipolar electrode 23 and a negative electrode active material layer 15 of another bipolar electrode 23 adjacent to the one bipolar electrode 23. Incidentally, the negative electrode active material layer 15 is formed to be one size larger than the positive electrode active material layer 13 as viewed in the direction of lamination of the power generating element 21.

Furthermore, the technical scope of the present invention is not limited to the bipolar secondary battery illustrated in FIG. 1, and for example, the technical scope may also be a consequently similar battery having a serially connected structure in which a plurality of single battery layers is laminated electrically in series, as disclosed in WO 2016/031688 A.

Meanwhile, although not illustrated in the drawings, in the bipolar lithium ion secondary battery 10 of FIG. 1, the negative electrode active material layer 15 functions as a negative electrode of a secondary battery, by including a negative electrode active material. Furthermore, the negative electrode active material layer 15 may include carbon fibers, which are conductive fibers, as a conductive member. Since the negative electrode active material layer 15 includes carbon fibers, conductive paths electrically connecting from a first principal surface that is in contact with the electrolyte layer 17 side of the negative electrode active material layer 15 to a second principal surface that is in contact with the current collector 11 side, and these conductive paths and the negative electrode active material can be electrically connected. Similarly, the positive electrode active material layer 13 may include carbon fibers, which are conductive fibers, as a conductive member. Since the positive electrode active material layer 13 includes carbon fibers, conductive paths electrically connecting from a first principal surface that is in contact with the separator 17 side of the positive electrode active material layer 13 to a second principal surface that is in contact with the current collector 11 side can be formed, and these conductive paths and the negative electrode active material can be electrically connected. Furthermore, the negative electrode active material layer 15 and the positive electrode active material layer 13 do not include a binder that is generally included in an active material layer of a non-aqueous electrolyte secondary battery (that is, being a "non-bound body").

The positive electrode active material layer 13, the separator 17, and the negative electrode active material layer 15 which are adjacent to each other form one single battery layer 19. Thus, it may be mentioned that the bipolar lithium ion secondary battery 10 has a configuration in which the single battery layer 19 is laminated. In addition, a seal part (insulating layer) 31 is arranged on outer periphery of the single battery layer 19. Accordingly, liquid junction caused by leakage of an electrolyte solution from the separator 17 is prevented, and a contact between neighboring current collectors 11 in a battery or an occurrence of a short-circuit resulting from subtle displacement of an end part of the single battery layer 19 in the power generating element 21, or the like is prevented. Furthermore, the positive electrode active material layer 13 is formed on only one surface of the outermost layer current collector 11a on the positive electrode side which is present on the outermost layer of the power generating element 21. In addition, the negative electrode active material layer 15 is formed on only one surface of the outermost layer current collector 11b on the negative electrode side which is present on the outermost layer of the power generating element 21.

Furthermore, in the bipolar lithium ion secondary battery 10 shown in FIG. 1, a positive electrode current collecting plate (positive electrode tab) 25 is arranged such that it is adjacent to the outermost layer current collector 11a on the positive electrode side, and extended and drawn from the laminate film 29 as an outer casing body. On the other hand, a negative electrode current collecting plate (negative electrode tab) 27 is arranged such that it is adjacent to the outermost layer current collector 11b on the negative electrode side, and also extended and drawn from the laminate film 29.

Moreover, the number of times of laminating the single battery layer 19 is adjusted depending on a desired voltage. Incidentally, in the bipolar lithium ion secondary battery 10, the number of times of laminating the single battery layer 19 may be reduced if a sufficient output can be secured even if the thickness of the battery is made as small as possible. It is also preferable for the bipolar lithium ion secondary battery 10 to have a structure in which the power generating element 21 is sealed under reduced pressure in the laminate film 29 as an outer casing body and the positive electrode current collecting plate 25 and the negative electrode current collecting plate 27 are drawn to the outside of the laminate film 29 in order to prevent an impact from outside and environmental deterioration at the time of use.

Subsequently, the characteristic configuration of the bipolar lithium ion secondary battery 10 according to the present embodiment will be described.

Figure 2:
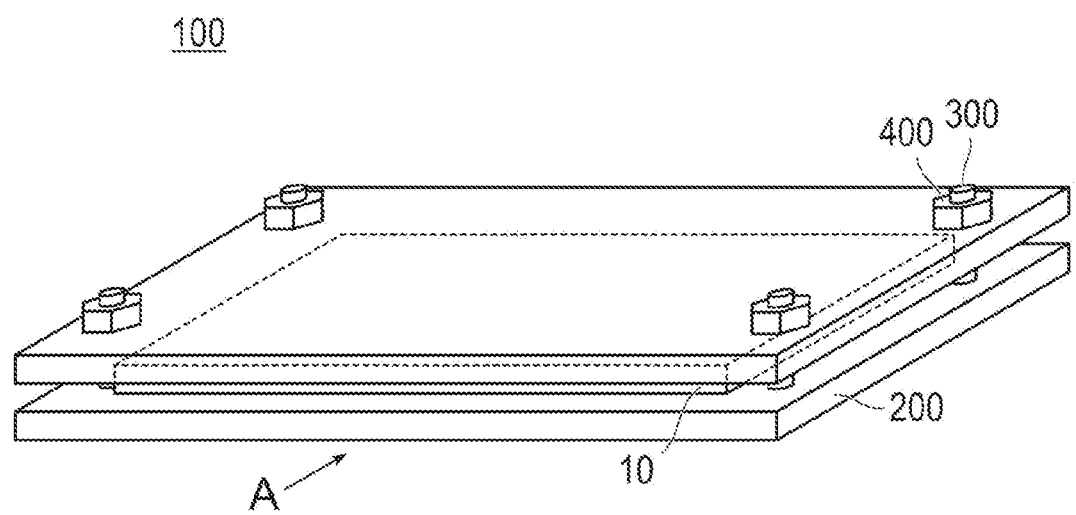
FIG. 2 is a perspective view of a battery device including a bipolar lithium ion secondary battery according to an embodiment of the present invention.
Figure 3:
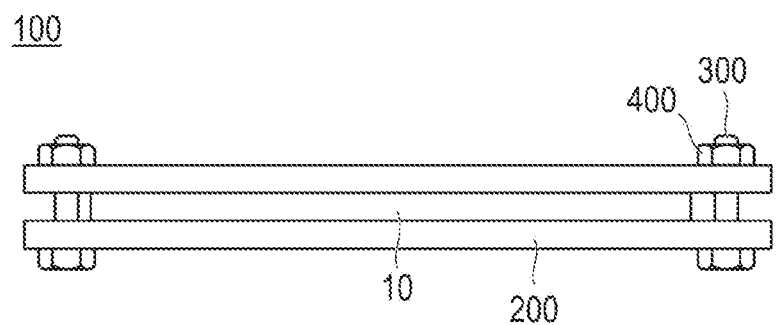
FIG. 3 is a lateral view viewed in the direction A illustrated in FIG. 2.

FIG. 2 is a perspective view of a battery device including a bipolar lithium ion secondary battery according to an embodiment of the present invention. FIG. 3 is a lateral view viewed in the direction A illustrated in FIG. 2.

As illustrated in FIG. 2, a battery device 100 including the bipolar lithium ion secondary battery according to the present embodiment has the bipolar lithium ion secondary battery 10 illustrated in FIG. 1; two sheets of metal plates 200 having the bipolar lithium ion secondary battery 10 interposed therebetween; and bolts 300 and nuts 400 as fastening members. These fastening members (bolts 300 and nuts 400) have a function of fixing the bipolar lithium ion secondary battery 10 in a state of being interposed between the metal plates 200. Thereby, the metal plates 200 and the fastening members (bolts 300 and nuts 400) function as a pressurizing member that pressurizes the power generating element 21 included in the bipolar lithium ion secondary battery in the direction of lamination thereof. Incidentally, the pressurizing member are not particularly limited as long as they are capable of pressurizing the power generating element 21 included in the bipolar lithium ion secondary battery 10 in the direction of lamination thereof. As the pressurizing member, typically, a combination of plates formed from a material having rigidity, such as the metal plates 200, and the above-mentioned fastening members is used. Furthermore, also regarding the fastening members, in addition to the bolts 300 and nuts 400, tension plates that fix the edges of the metal plates 200 so as to pressurize the power generating element 21 in the direction of lamination thereof, and the like may also be used.

Figure 4:
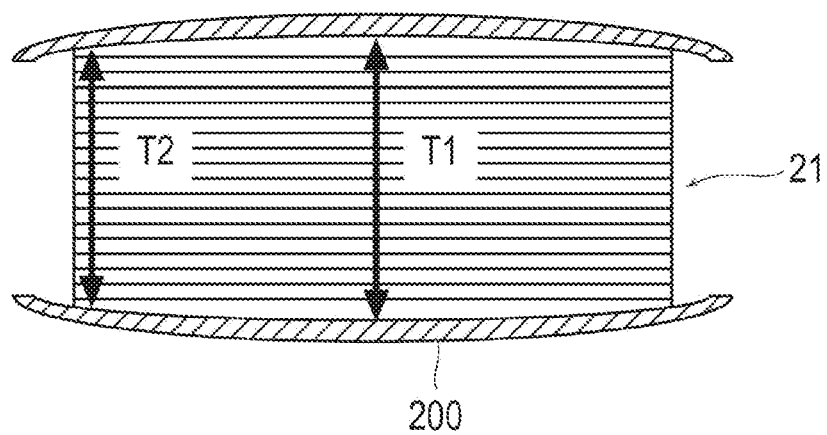
FIG. 4 is a schematic cross-sectional view for explaining a feature of the battery device according to the present invention.

FIG. 4 is a schematic cross-sectional view for explaining the features of the battery device according to the present invention. As illustrated in FIG. 4, the power generating element 21 of the non-aqueous electrolyte secondary battery that constitutes the battery device according to the present invention are pressurized by a pressurizing member (a pair of metal plates 200). Then, as a result of pressurization by the pressurizing member, the thickness of the power generating element 21 has a variation in the planar direction of the power generating elements. Here, the "thickness of the power generating element 21" in the present specification is to mean the distance (in the direction of lamination of the power generating element) between the outermost surfaces of the active material layers positioned in both the outermost layers of the power generating element in the area in which a positive electrode active material layer 13 and a negative electrode active material layer 15 constituting a power generating element face each other.

In the battery device according to the present aspect, the variation in the thickness of the power generating element 21 is controlled to a predetermined range. That is, when the thickness of the thickest portion in the direction of lamination of the power generating element 21 is designated as T1, and the thickness of the thinnest portion is designated as T2, it is essential that the following Mathematical Formula (1):

[Mathematical Formula 2]

$$0.1 < (T1-T2)/T1 \times 100 < 5 \qquad (1).$$

is satisfied (see T1 and T2 illustrated in FIG. 4). Here, when the value of (T1−T2)/T1×100 is 0.1 or less, as the force of pressurization required to sufficiently decrease the internal resistance is increased, an increase in the size of the pressurizing member cannot be avoided. As a result, the battery performance cannot be enhanced without decreasing the energy density of the battery device. On the other hand, when the value of (T1−T2)/T1×100 is or greater, the force of pressurization applied to a site where the thickness of the power generating element is small becomes too large, and there is a risk that the power generating element may break. Incidentally, according to a preferred embodiment, the battery device further satisfies the following Mathematical Formula (2):

[Mathematical Formula 4]

$$0.3 < (T1-T2)/T1 \times 100 < 3 \qquad (2)$$

Furthermore, according to a more preferred embodiment, the battery device further satisfies the following Mathematical Formula (3):

[Mathematical Formula 5]

$$0.9 < (T1-T2)/T1 \times 100 < 3 \qquad (3)$$

By adopting such a configuration, it is possible to further enhance the battery performance. Furthermore, there are no particular limitations on the specific technique for configuring the battery device such that the battery device satisfies the above-mentioned Mathematical Formula (1) to Mathematical Formula (3), and in the case of controlling the form of disposition of the pressurizing member or using fastening members, it is possible to obtain a battery device that satisfies the above-described mathematical formulae by regulating the fastening force of the members or the like. Incidentally, the determination of whether the thickness of the power generating element 21 satisfies the above-mentioned Mathematical Formula (1) to Mathematical Formula (3) can be carried out by, for example, a non-destructive technique of using the X-ray CT device described in the section of Examples that will be described below. Meanwhile, if the same values of T1 and T2 as those in the case of using a non-destructive technique such as X-ray CT are obtained, this determination may be carried out by a destructive method. For example, T1 and T2 can be measured by embedding the entirety of the battery device in an embedding material such as a resin such that the power generating element in a pressurized state are fixed and cutting this. Furthermore, in a case in which the value of (T1−T2)/T1×100 varies depending on how a cut plane of the power generating element 21 for calculating T1 and T2 is set up, when the measured values of T1 and T2 in any one of cut planes along the direction of lamination of the power generating element 21, which pass through the center of gravity in the case in which the power generating element 21 are viewed in planar view, satisfy the above-described Mathematical Formula (1), it is considered that the measured values are in the ranges of the present invention. Furthermore, a battery module in which a plurality of batteries each having power generating elements encapsulated inside an outer casing body is laminated, may constitute the battery device together with a pressurizing member. In such a case, as long as at least one of the batteries constituting this battery module satisfies the relationship of the above-mentioned Mathematical Formula (1), the battery module is considered to be included in the technical scope of the present invention.

As described above, for the purpose of solving the problems of cracks in the electrode active material layer and a decrease in the battery performance concomitant with these cracks, the present inventors conducted an investigation on the use of an electrode in which a non-bound active material layer that is not bound by a binder is disposed on the surface of a current collector.

Since the constituent components of such a non-bound active material layer are not bound by a binder, when compared with a dry electrode that is bound by a binder, the electrical conductivity of the active material layer tends to be lowered. In order to suppress such a decrease in electrical conductivity, it is after all effective to pressurize the cells in the direction of lamination of the cells. However, according to the investigation of the present inventors, it has been found that the internal resistance of a cell in the case of using a non-bound active material layer has sensitivity to the force of pressurization, and the internal resistance of a cell is not sufficiently decreased unless a much larger force of pressurization compared to the case of a dry electrode is applied. Incidentally, in a dry electrode, since the constituent components of the active material layer are bound by a binder, there is no sensitivity to the force of pressurization, and it is possible to suppress an increase in the internal resistance even with a relatively small force of pressurization. On the other hand, in order to apply a large force of pressurization uniformly in the planar direction of the cells as described above, there is a problem that the pressurizing member for pressurizing the cells should undergo an increase in size, and the energy density as a battery device including even these pressurizing members is decreased to a large extent.

With regard to such a newly found problem, when a battery device that satisfies the above-described Mathematical Formula (1) as illustrated in FIG. 4 is used, the problem can be solved. That is, the present inventors surprisingly further found that by adopting the configuration according to the present aspect, even if a large force of pressurization is not uniformly applied to a power generating element (that is, even if a large-sized pressurizing member that brings a decrease in the energy density are not disposed), it is possible to lower the internal resistance of the battery and to also enhance the cycle characteristics of the battery. This is speculated to be because, according to the battery device that satisfies the above-described Mathematical Formula (1), the non-bound active material layer pressurized in the direction of lamination of the power generating element flows, and thereby homogenization of pressure inside the active material layer can be promoted.

Incidentally, the minimum value (lowest load) of the load (force of pressurization in the direction of lamination of power generating element) applied to the power generating element 21 is preferably 20 kPa or greater, and more preferably 200 kPa or greater. By adopting such a configuration, the effect of the present invention can be exhibited more noticeably. Incidentally, in a case in which the power generating element is viewed in the planar direction, the "force of pressurization in the direction of lamination of the power generating element" cannot be said to be always constant and may be scattered depending on the site. The "minimum value (lowest load) of the force of pressurization in the direction of lamination of the power generating element" means the smallest value among the forces of pressurization (loads) scattered depending on the site. Furthermore, the upper limit value of the lowest load is not particularly limited; however, since it is not to pressurize the entirety with a large pressure, this upper limit value is preferably 250 kPa or less.

Hereinafter, main constituent elements of a bipolar lithium ion secondary battery will be described.

[Current Collector]

The current collector has a function of mediating electron transfer from one surface in contact with a positive electrode active material layer to the other surface in contact with a negative electrode active material layer. Although a material that constitutes the current collector is not particularly limited, for example, a metal is exemplified. Further, a current collector may be containing a resin layer having conductivity (a so-called "resin current collector").

Specific examples of the metal include aluminum, nickel, iron, stainless steel, titanium, copper, and the like. In addition to those, a clad material of nickel and aluminum, a clad material of copper and aluminum or the like can be preferably used. It may also be a foil obtained by coating aluminum on a metal surface. Among those, from the viewpoints of electron conductivity, a battery operating potential, adhesion of a negative electrode active material by sputtering to a current collector, and the like, aluminum, stainless steel, copper, or nickel is preferable.

Furthermore, examples of the constituting component of the "resin current collector" containing a resin layer having conductivity include a resin formed by adding a conductive filler to a conductive polymer material or a non-conductive polymer material, as necessary. Examples of the conductive polymer material include polyaniline, polypyrrole, polythiophene, polyacetylene, polyparaphenylene, polyphenylene vinylene, polyacrylonitrile, polyoxadiazole, and the like. These conductive polymer materials are advantageous in terms of easiness of a production step or reduction in the weight of the current collector since the conductive polymer materials have sufficient conductivity even without addition of a conductive filler.

Examples of the non-conductive polymer material include polyethylene (PE; high density polyethylene (HDPE), low density polyethylene (LDPE) and the like), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), and the like. Such non-conductive polymer materials can have excellent voltage resistance or solvent resistance.

A conductive filler can be added to the conductive polymer material or the non-conductive polymer material, as necessary. In particular, in a case where a resin serving as a base material of the current collector includes only a non-conductive polymer, a conductive filler is necessarily indispensable in order to impart conductivity to the resin.

As the conductive filler, any material having conductivity can be used without particular limitation. Examples of the material having excellent conductivity, potential resistance, or lithium ion shielding properties include a metal, a conductive carbon, and the like. The metal is not particularly limited, but it is preferable that the metal includes at least one metal selected from the group consisting of Ni, Ti, Al, Cu, Pt, Fe, Cr, Sn, Zn, In, Sb, and K, or an alloy or metal oxide including such the metal. Further, the conductive carbon is not particularly limited. It is preferable that the conductive carbon includes at least one selected from the group consisting of acetylene black, VULCAN (registered trademark), BLACK PEARL (registered trademark) carbon nanofiber, Ketjen black (registered trademark) carbon nanotube, carbon nanohorn, carbon nanobaloon, and fullerene.

The amount of the conductive filler to be added is not particularly limited as long as it can impart sufficient conductivity to the current collector, and is generally approximately 5 to 35% by volume.

Furthermore, the current collector of the present aspect may have a single-layer structure formed of a single material or a laminate structure in which layers composed for those materials are suitably combined. From the viewpoint of reduction in the weight of the current collector, it is preferable to include a conductive resin layer formed of at least a resin having conductivity. In addition, from the viewpoint of blocking the transfer of lithium ions between the single battery layers, a metal layer may be disposed on a part of the current collector. The thickness of the current collector is not particularly limited; however, the thickness is preferably 50 to 100 μm.

[Positive Electrode Active Material Layer]

The positive electrode active material layer includes a positive electrode active material and optionally a coating agent that coats the surface of this positive electrode active material. Furthermore, the positive electrode active material layer can further include, if necessary, a conductive member, an ion conductive polymer, a lithium salt, and the like.

Incidentally, in the present specification, a positive electrode active material in a state of being coated with a coating agent is also referred to as "coated positive electrode active material particles". A coated positive electrode active material particle has a core-shell structure in which a shell part that includes a coating agent including a coating resin and a conductive aid is formed on the surface of a core part that includes a positive electrode active material.

(Positive Electrode Active Material)

Examples of the positive electrode active material include a lithium-transition metal composite oxide such as $LiMn_2O_4$, $LiCoO_2$, $LiNiO_2$, $Li(Ni-Mn-Co)O_2$, or a compound in which some of these transition metals are replaced by other elements, a lithium-transition metal phosphate compound, a lithium-transition metal sulfate compound, and the like. Two or more positive electrode active materials may be used in combination in some cases. The lithium-transition metal composite oxide is preferably used as the positive electrode active material from the viewpoint of capacity and output characteristics. A composite oxide containing lithium and nickel is more preferably used. $Li(Ni-Mn-Co)O_2$ and a compound in which some of these transition metals are replaced by other elements (hereinafter also simply referred to as an "NMC composite oxide"), a lithium-nickel-cobalt-aluminum composite oxide (hereinafter also simply referred to as an "NCA composite oxide"), or the like is more preferably used. The NMC composite oxide has a layered crystal structure in which a lithium atom layer and a transition metal (Mn, Ni, and Co are orderly arranged) atomic layer are alternately laminated via an oxygen atom layer. In addition, one Li atom is included per atom of a transition metal M, and the amount of Li that can be taken out is twice that of a spinel-based lithium manganese oxide, that is, a supply capacity is doubled, and the capacity can thus be high.

As described above, the NMC composite oxide also includes composite oxides in which some of the transition metal elements are replaced by other elements. Examples of the other elements in this case include Ti, Zr, Nb, W, P, Al, Mg, V, Ca, Sr, Cr, Fe, B, Ga, In, Si, Mo, Y, Sn, V, Cu, Ag, Zn, and the like; Ti, Zr, Nb, W, P, Al, Mg, V, Ca, Sr, or Cr is preferable; Ti, Zr, P, Al, Mg, or Cr is more preferable; and Ti, Zr, Al, Mg, or Cr is even still more preferable from the viewpoint of improving the cycle characteristics.

Since the NMC composite oxide has a high theoretical discharge capacity, it preferably satisfies General Formula (1): $LiaNibMncCodMxO_2$ (in which a, b, c, d, and x satisfy $0.9 \leq a \leq 1.2$, $0 < b < 1$, $0 < c \leq 0.5$, $0 < d \leq 0.5$, $0 \leq x \leq 0.3$, and $b+c+d=1$; and M is at least one element selected from the group consisting of Ti, Zr, Nb, W, P, Al, Mg, V, Ca, Sr, and Cr). Here, a represents the atomic ratio of Li, b represents the atomic ratio of Ni, c represents the atomic ratio of Mn, d represents the atomic ratio of Co, and x represents the atomic ratio of M. In General Formula (1), $0.4 \leq b \leq 0.6$ is preferably satisfied from the viewpoint of cycle characteristics. In addition, the composition of each element can be measured by, for example, inductively coupled plasma (ICP) emission spectrometry.

In general, it is known that nickel (Ni), cobalt (Co), and manganese (Mn) contribute to capacity and output characteristics from the viewpoints of improving the purity of a material and improving the electron conductivity. Some of the transition metals in a crystal lattice are replaced by T1 and the like. Some of atoms of a transition metal element are preferably replaced by atoms of other elements from the viewpoint of cycle characteristics, and $0 < x \leq 0.3$ is particularly preferably satisfied in General Formula (1). Due to the solid solution of at least one selected from the group consisting of Ti, Zr, Nb, W, P, Al, Mg, V, Ca, Sr, and Cr, the crystal structure is stabilized, and as a result, it is considered that reduction in capacity of the battery can be prevented even after repeated charge/discharge, and thus, excellent cycle characteristics can be achieved.

As a more preferable embodiment, in General Formula (1), b, c, and d preferably satisfy $0.44 \leq b \leq 0.51$, $0.27 \leq c \leq 0.31$, and $0.19 \leq d \leq 0.26$ from the viewpoint of improving a balance between the capacity and the life characteristics. For example, $LiNi_{0.5}Mn_{0.3}Co_{0.2}O_2$ has a larger capacity per unit weight than $LiCoO_2$, $LiMn_2O_4$, $LiNi_{1/3}Mn_{1/3}Co_{1/3}O_2$, or the like which has been proven to be satisfactory in a general consumer-use battery. This makes it possible to improve the energy density and brings about an advantage that a compact and high-capacity battery can be manufactured, and thus, it is preferable, also from the viewpoint of a cruising distance. $LiNi_{0.8}Co_{0.1}Al_{0.1}O_2$ is more advantageous in terms of larger capacity, but has a problem in the life characteristics. In contrast, $LiNi_{0.5}Mn_{0.3}Co_{0.2}O_2$ has excellent life characteristics similar to $LiNi_{1/3}Mn_{1/3}Co_{1/3}O_2$.

Incidentally, it is a matter of course that a positive electrode active material other than that described above may also be used. The average particle size of the positive electrode active material is not particularly limited; however, from the viewpoint of increasing the power output, the average particle size is preferably 1 to 100 μm, and more preferably 1 to 20 μm.

(Coating Agent)

The coating agent includes a coating resin and a conductive aid. As the coating agent exists on the surface of the positive electrode active material, ion conductive paths and electron conduction paths to the positive electrode active material surface can be secured in the positive electrode active material layer.

(Coating Resin)

The coating resin exists on the surface of the electrode active material and has a function of absorbing and holding an electrolyte solution. Thus, an ion conductive path from the surface of the electrode active material to the electrolyte layer can be formed in the electrode active material layer.

In the bipolar secondary battery of the present aspect, a material of the coating resin is not particularly limited, but it is preferable that the material includes at least one selected from the group consisting of (A) a polyurethane resin and (B) a polyvinyl resin from the viewpoint of flexibility and liquid absorption.

(A) Polyurethane Resin

Since the polyurethane resin has high flexibility (high tensile elongation at break) and urethane bonds form a strong hydrogen bond mutually, it is possible to constitute a coating agent which has excellent flexibility and is structurally stable by using the polyurethane resin as a coating resin.

A specific form of the polyurethane resin is not particularly limited, and appropriate reference can be made to findings conventionally known about the polyurethane resin. The polyurethane resin may be composed of a polyisocyanate component (a1) and a polyol component (a2), and an ionic group introducing component (a3), an ionic group neutralizer component (a4), and a chain extender component (a5), as necessary, may be further used.

Examples of the polyisocyanate component (a1) include a diisocyanate compound having two isocyanate groups in one molecule and a polyisocyanate compound having three or more isocyanate groups in one molecule as. These may be used alone or in combination of two or more kinds thereof.

Examples of the diisocyanate compounds include aromatic diisocyanates such as 4,4'-diphenylmethane diisocyanate (MDI), 2,4- and/or 2,6-tolylene diisocyanate, p-phenylene diisocyanate, xylylene diisocyanate, 1,5-naphthalene diisocyanate, 3,3'-dimethyldiphenyl-4,4'-diisocyanate, dianisidine diisocyanate, tetramethylxylylene diisocyanate, and the like; alicyclic diisocyanates such as isophorone diisocyanate, dicyclohexylmethane-4,4'-diisocyanate, trans-1,4-cyclohexyl diisocyanate, norbornene diisocyanate, and the like; and aliphatic diisocyanates such as 1,6-hexamethylene diisocyanate, 2,2,4 and/or (2,4,4)-trimethylhexamethylene diisocyanate, lysine diisocyanate, and the like.

Such diisocyanate compound may be used in the form of a modified product from carbodiimide modification, isocyanurate modification, biuret modification, or the like, or may be used in the form of a blocked isocyanate blocked by various blocking agents.

Examples of the polyisocyanate compound having three or more isocyanate groups in one molecule include the above-exemplified isocyanurate trimers, biuret trimers, trimethylolpropane adducts of the diisocyanate, and the like; trifunctional or more isocyanate such as triphenylmethane triisocyanate, 1-methylbenzole-2,4,6-triisocyanate, dimethyl triphenylmethane tetraisocyanate, and the like; etc., and these isocyanate compounds may be used in the form of a modified product from carbodiimide modification, isocyanurate modification, biuret modification, or the like, or may be used in the form of a blocked isocyanate blocked by various blocking agents.

Examples of the polyol component (a2) includes a diol compound having two hydroxyl groups in one molecule and a polyol compound having three or more hydroxyl groups in one molecule, and these may be used alone or in combination of two or more kinds thereof.

Examples of the diol compound and the polyol compound having three or more hydroxyl groups in one molecule include low-molecular-weight polyols, polyether polyols, polyester polyols, polyester polycarbonate polyols, crystalline or amorphous polycarbonate polyols, polybutadiene polyols, and silicone polyols.

Examples of the low-molecular-weight polyols include aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, and the like; alicyclic diols such as cyclohexanedimethanol, cyclohexanediol, and the like; and trihydric or higher polyols such as trimethylolethane, trimethylolpropane, hexitols, pentitols, glycerin, polyglycerin, pentaerythritol, dipentaerythritol, tetramethylolpropane, and the like.

Examples of the polyether polyols include ethylene oxide adducts such as diethylene glycol, triethylene glycol, tetraethylene glycol, polyethylene glycol, and the like; propylene oxide adducts such as dipropylene glycol, tripropylene glycol, tetrapropylene glycol, and polypropylene glycol; and polypropylene glycol; ethylene oxide and/or propylene oxide adducts of the low molecular weight polyols as described above; polytetramethylene glycol; and the like.

The polyester polyols include, for example, a polyester polyol obtained by direct esterification and/or ester-exchange reaction of a polyol such as the above low-molecular-weight polyols with a less than stoichiometric quantity of a polycarboxylic acid or an ester-forming derivative (ester, anhydride, halide, and the like) of the polycarboxylic acid and/or a lactone or a hydroxycarboxylic acid obtained by ring-opening hydrolysis of the lactone. The polycarboxylic acid or an ester-forming derivative thereof includes, for example, polycarboxylic acid such as aliphatic dicarboxylic acids such as oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, and dimer acid; aromatic dicarboxylic acids such as phthalic acid, terephthalic acid, isophthalic acid, and naphthalenedicarboxylic acid; alicyclic dicarboxylic acids such as cyclohexanedicarboxylic acid; tricarboxylic acids such as trimellitic acid, trimesic acid, and trimer of castor oil fatty acid; and tetracarboxylic acids such as pyromellitic acid. The ester-forming derivatives of the polycarboxylic acids include anhydrides of the polycarboxylic acids, halides such as chlorides and bromides of the polycarboxylic acids, lower aliphatic esters such as methyl, ethyl, propyl, isopropyl, butyl, isobutyl, and amyl esters of the polycarboxylic acids. The lactones include γ-caprolactone, δ-caprolactone, ε-caprolactone, dimethyl-ε-caprolactone, δ-valerolactone, γ-valerolactone, γ-butyrolactone, and the like.

Examples of the ionic group introducing component (a3) used as necessary include an anionic group introducing component and a cationic group introducing component. Examples of the anionic group introducing component include carboxyl group-containing polyols such as dimethylolpropionic acid, dimethylolbutanoic acid, dimethylolbutyric acid, dimethylolvaleric acid, and the like; and sulfonic acid group-containing polyols such as 1,4-butanediol-2-sulfonic acid and the like, and examples of the cationic group introducing component include N,N-dialkylalkanolamines, N-alkyl-N,N-dialkanolamines such as N-methyl-N,N-diethanolamine, N-butyl-N,N-diethanolamine, and the like, and trialkanolamines.

Examples of the ionic group neutralizer component (a4) include tertiary amine compounds including trialkylamines such as trimethylamine, triethylamine, tributylamine, and the like, N,N-dialkylalkanolamines such as N,N-dimethylethanolamine, N,N-dimethylpropanolamine, N,N-dipropylethanolamine 1-dimethylamino-2-methyl-2-propanol, and the like, N-alkyl-N,N-dialkanolamines, trialkanolamines such as triethanolamine and the like, etc.; and basic compounds such as ammonia, trimethylammonium hydroxide, sodium hydroxide, potassium hydroxide, lithium hydroxide, and the like, and examples of the ionic group neutralizer include organic carboxylic acids such as formic acid, acetic acid, lactic acid, succinic acid, glutaric acid, citric acid, and the like; organic sulfonic acids such as para-toluenesulfonic acid, alkyl sulfonate, and the like; inorganic acids such as hydrochloric acid, phosphoric acid, nitric acid, sulfuric acid, and the like; epoxy compounds such as epihalohydrin and the like; and quaternizing agents such as dialkyl sulfate, alkyl halide, and the like.

As the chain extender component (a5) used as necessary, well-known chain extenders may be used alone or in combination of two or more kinds thereof, and a diamine compound, a polyhydric primary alcohol, or the like is preferable, and a polyhydric amine compound is more preferable. Examples of the polyhydric amine compound include low-molecular-weight diamines such as ethylenediamine, propylenediamine, and the like, with a structure in which alcoholic hydroxyl groups of the above-exemplified low-molecular-weight diols are substituted with amino groups; polyetherdiamines such as polyoxypropylenediamine, polyoxyethylenediamine, and the like; alicyclic diamines such as menthenediamine, isophoronediamine, norbornenediamine, bis(4-amino-3-methyldicyclohexyl)methane, diaminodicyclohexylmethane, bis(amino-methyl)cyclohexane, 3,9-bis(3-aminopropyl)-2,4,8,10-tetraoxaspiro(5,5)undecane, and the like; aromatic diamines such as m-xylenediamine, α-(m/p-aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, α,α'-bis(4-aminophenyl)-p-diisopropylbenzene, and the like; hydrazine; and dicarboxylic acid dihydrazide compounds which are compounds with dicarboxylic acid and hydrazine, exemplified as a polycarboxylic acid used for the polyester polyols.

Among the respective components as described above, as the polyisocyanate component (a1), a diisocyanate compound is preferably used, 4,4'-diphenylmethane diisocyanate (MDI), 2,4'-diphenylmethane diisocyanate, 4,4'-dicyclohexyl methane diisocyanate, 1,4-cyclohexane diisocyanate, 2,4-toluene diisocyanate, 1,6-hexamethylene diisocyanate, or the like is particularly preferably used, and 4,4'-diphenylmethane diisocyanate (MDI) is most preferably used. Furthermore, as the polyol component (a2), an ethylene oxide adduct which is a diol compound is preferably used as an essential component, and polyethylene glycol is particularly preferably used as an essential component. Since polyethylene glycol has excellent lithium ion conductivity, such a configuration makes it possible to remarkably exhibit an effect of lowering (suppressing an increase in)

internal resistance of the battery. Here, a number average molecular weight calculated from a hydroxyl value of polyethylene glycol is not particularly limited, but is preferably 2,500 to 15,000, more preferably 3,000 to 13,000, and still more preferably 3,500 to 10,000. Incidentally, it is preferable to further use ethylene glycol and/or glycerin as a polyol component in addition to the above-described essential components from the viewpoint of excellent heat resistance. In particular, if only ethylene glycol is used while not using glycerin, a gel obtained by swelling of the coating resin is a physically crosslinked gel, and therefore, it can be dissolved in a solvent in the preparation and various production methods as described later can be applied. On the other hand, if glycerin is used in addition to ethylene glycol, the main chains of a polyurethane resin are chemically crosslinked with each other, and in this case, there is an advantage that a degree of swelling to an electrolyte solution can be arbitrarily controlled by controlling a molecular weight between the crosslinks.

In addition, a method for synthesizing the polyurethane resin is not particularly limited and appropriate reference can be made to findings conventionally known.

(B) Polyvinyl-Based Resin

Since the polyvinyl resin has high flexibility (high tensile elongation at break as described later), it is possible to mitigate a volume change of the active material accompanying the charging and discharging reaction and suppress the expansion of the active material layer by using the polyvinyl resin as a coating resin.

A specific form of the polyvinyl resin is not particularly limited, and appropriate reference can be made to findings conventionally known as long as the polyurethane resin is a polymer obtained by polymerization of monomers including a polymerizable unsaturated bond (hereinafter also referred to as a "vinyl monomer").

In particular, as the vinyl monomer, a vinyl monomer (b1) having a carboxy group and a vinyl monomer (b2) represented by the following general formula (1) are preferably included.

[Chem. 1]

$$CH_2=C(R^1)COOR^2 \quad (1)$$

In Formula (1), $R^1$ is a hydrogen atom or a methyl group, and $R^2$ is a linear alkyl group having 1 to 4 carbon atoms or a branched alkyl group having 4 to 36 carbon atoms.

The vinyl monomer (b1) having a carboxyl group is a monocarboxylic acid having 3 to 15 carbon atoms, such as methacrylic acid, crotonic acid, cinnamic acid, and the like; a dicarboxylic acid having 4 to 24 carbon atoms, such as maleic acid (anhydride), fumaric acid (anhydride), itaconic acid (anhydride), citraconic acid, mesaconic acid, and the like; a tri- or tetravalent or higher polycarboxylic acid having 6 to 24 carbon atoms, such as aconitic acid and the like; etc. Among those, the (meth)acrylic acid is preferable, and methacrylic acid is particularly preferable.

In the vinyl monomer (b2) represented by General Formula (1), $R^1$ represents a hydrogen atom or a methyl group. $R^1$ is preferably the methyl group.

$R^2$ is a linear alkyl group having 1 to 4 carbon atoms or a branched alkyl group having 4 to 36 carbon atoms, and Specific examples of $R^2$ include a methyl group, an ethyl group, a propyl group, a 1-alkylalkyl group (a 1-methylpropyl group (sec-butyl group), a 1,1-dimethylethyl group (tert-butyl group), a 1-methylbutyl group, a 1-ethylpropyl group, a 1,1-dimethylpropyl group, a 1-methylpentyl group, a 1-ethylbutyl group, a 1-methylhexyl group, a 1-ethylpentyl group, a 1-methylheptyl group, a 1-ethylhexyl group, a 1-methyloctyl group, a 1-ethylheptyl group, a 1-methylnonyl group, a 1-ethyloctyl group, a 1-methyldecyl group, a 1-ethyl nonyl group, a 1-butyl eicosyl group, a 1-hexyloctadecyl group, a 1-octylhexadecyl group, a 1-decyltetradecyl group, a 1-undecyltridecyl group, and the like), a 2-alkylalkyl group (a 2-methylpropyl group (iso-butyl group), a 2-methylbutyl group, a 2-ethylpropyl group, a 2,2-dimethylpropyl group, a 2-methylpentyl group, a 2-ethylbutyl group, a 2-methylhexyl group, a 2-ethylpentyl group, a 2-methylheptyl group, a 2-ethylhexyl group, a 2-methyloctyl group, a 2-ethylheptyl group, a 2-methylnonyl group, a 2-ethyloctyl group, a 2-methyldecyl group, a 2-ethylnonyl group, a 2-hexyloctadecyl group, a 2-octylhexadecyl group, a 2-decyltetradecyl group, a 2-undecyltridecyl group, a 2-dodecylhexadecyl group, a 2-tridecylpentadecyl group, a 2-decyloctadecyl group, a 2-tetradecyloctadecyl group, a 2-hexadecyloctadecyl group, a 2-tetradecyleicosyl group, a 2-hexadecyleicosyl group, or the like), 3- to 34-alkylalkyl groups (a 3-alkylalkyl group, a 4-alkylalkyl group, a 5-alkylalkyl group, a 32-alkylalkyl group, a 33-alkylalkyl group, a 34-alkylalkyl group, and the like); mixed alkyl groups containing one or more branched alkyl groups such as residues of oxo alcohols produced corresponding to propylene oligomers (from heptamers to undecamers), ethylene/propylene (molar ratio of 16/1 to 1/11) oligomers, isobutylene oligomers (from heptamers to octamers), α-olefin (having 5 to 20 carbon atoms) oligomers (from tetramers to octamers), or the like; etc.

Among those, from the viewpoint of liquid absorption of an electrolyte solution, the methyl group, the ethyl group, or the 2-alkylalkyl group is preferable, and the 2-ethylhexyl group and the 2-decyltetradecyl group are more preferable.

Moreover, the monomers constituting the polymer may also include a copolymerizable vinyl monomer (b3) containing no active hydrogen, in addition to the vinyl monomer (b1) having a carboxyl group and the vinyl monomer (b2) represented by the general formula (1) above.

Examples of the copolymerizable vinyl monomer (b3) containing no active hydrogen include the following (b31) to (b35).

(b31) Hydrocarbyl (Meth)Acrylate Formed from Monools Having 1 to 20 Carbon Atoms and (Meth)Acrylic Acid Examples of the monool include (i) aliphatic monools [methanol, ethanol, n- or i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, stearyl alcohol, and the like]; (ii) alicyclic monools [cyclohexyl alcohol and the like]; (iii) araliphatic monools [benzyl alcohol, and the like]; and mixtures of two or more thereof.

(b32) Poly (n=2 to 30)Oxyalkylene (Having 2 to 4 Carbon Atoms) Alkyl (Having 1 to 18 Carbon Atoms) Ether (Meth)Acrylates [(meth)acrylate of ethylene oxide (hereinafter abbreviated as EO) (10 mol) adduct of methanol, (meth)acrylate of propylene oxide (hereinafter abbreviated as PO) (10 mol) adduct of methanol, and the like]

(b33) Nitrogen-Containing Vinyl Compounds (b33-1) Amide Group-Containing Vinyl Compounds (i) (Meth)acrylamide compounds having 3 to 30 carbon atoms, for example, N,N-dialkyl (having 1 to 6 carbon atoms) or diaralkyl (having 7 to 15 carbon atoms) (meth)acrylamides [N,N-dimethylacrylamide, N,N-dibenzylacrylamide, and the like], and diacetone acrylamide (ii) Amide group-containing vinyl compounds having 4 to 20 carbon atoms excluding the above (meth)acrylamide compounds, for example, N-methyl-N-vinylacetamide, cyclic amides (pyrrolidone compounds (having 6 to 13 carbon atoms, for example, N-vinyl pyrrolidone and the like)).

(b33-2) (Meth)Acrylate Compounds (i) Dialkyl (having 1 to 4 carbon atoms) aminoalkyl (having 1 to 4 carbon atoms) (meth)acrylates [N,N-dimethylaminoethyl (meth)acrylate, N,N-diethylaminoethyl (meth)acrylate, t-butylaminoethyl (meth)acrylate, morpholinoethyl (meth)acrylate, and the like]

(ii) Quaternary ammonium group-containing (meth)acrylates [quaternary compounds obtained by quaternizing tertiary amino group-containing (meth)acrylates [N,N-dimethylaminoethyl (meth)acrylate, N,N-diethylaminoethyl (meth)acrylate, and the like] with a quaternizing agent (a quaternary product obtained by using the quaternizing agent), and the like]

(b33-3) Heterocyclic Ring-Containing Vinyl Compounds

Pyridine compounds (having 7 to 14 carbon atoms, for example, 2- or 4-vinyl pyridine), imidazole compounds (having 5 to 12 carbon atoms, for example, N-vinyl imidazole), pyrrole compounds (having 6 to 13 carbon atoms, for example, N-vinyl pyrrole), and pyrrolidone compounds (having 6 to 13 carbon atoms, for example, N-vinyl-2-pyrrolidone)

(b33-4) Nitrile Group-Containing Vinyl Compounds

Nitrile group-containing vinyl compounds having 3 to 15 carbon atoms, for example, (meth)acrylonitrile, cyanostyrene, and cyanoalkyl (having 1 to 4 carbon atoms) acrylate (b33-5) Other Nitrogen-Containing Vinyl Compounds Nitro group-containing vinyl compounds (having 8 to 16 carbon atoms, for example, nitrostyrene) and the like (b34) Vinyl Hydrocarbons (b34-1) Aliphatic Vinyl Hydrocarbons Olefins having 2 to 18 carbon atoms or more [ethylene, propylene, butene, isobutylene, pentene, heptene, diisobutylene, octene, dodecene, octadecene, and the like], dienes having 4 to 10 carbon atoms or more [butadiene, isoprene, 1,4-pentadiene, 1,5-hexadiene, 1,7-octadiene, and the like], and the like (b34-2) Alicyclic Vinyl Hydrocarbons Cyclic unsaturated compounds having 4 to 18 carbon atoms or more, for example, cycloalkene (for example, cyclohexene), (di)cycloalkadiene [for example, (di)cyclopentadiene], and terpene (for example, pinene, limonene, and indene)

(b34-3) Aromatic Vinyl Hydrocarbons

Aromatic unsaturated compounds having 8 to 20 carbon atoms or more, for example, styrene, α-methyl styrene, vinyl toluene, 2,4-dimethyl styrene, ethyl styrene, isopropyl styrene, butyl styrene, phenyl styrene, cyclohexyl styrene, and benzyl styrene (b35) Vinyl Esters, Vinyl Ethers, Vinyl Ketones, and Unsaturated Dicarboxylic Acid Diesters (b35-1) Vinyl Esters Aliphatic vinyl esters [having 4 to 15 carbon atoms, for example, alkenyl esters of aliphatic carboxylic acid (mono- or dicarboxylic acid) (for example, vinyl acetate, vinyl propionate, vinyl butyrate, diallyl adipate, isopropenyl acetate, and vinyl methoxy acetate)], aromatic vinyl esters [having 9 to 20 carbon atoms, for example, alkenyl esters of aromatic carboxylic acid (mono- or dicarboxylic acid) (for example, vinyl benzoate, diallyl phthalate, methyl-4-vinyl benzoate), and aromatic ring-containing esters of aliphatic carboxylic acid (for example, acetoxystyrene)]

(b35-2) Vinyl Ethers

Aliphatic vinyl ethers [having 3 to 15 carbon atoms, for example, vinyl alkyl (having 1 to 10 carbon atoms) ether (vinyl methyl ether, vinyl butyl ether, vinyl 2-ethylhexyl ether, and the like), vinyl alkoxy (having 1 to 6 carbon atoms) alkyl (having 1 to 4 carbon atoms) ethers (vinyl-2-methoxyethyl ether, methoxybutadiene, 3,4-dihydro-1,2-pyran, 2-butoxy-2'-vinyloxy diethyl ether, vinyl-2-ethylmercapto ethyl ether, and the like), and poly (2 to 4) (meth) allyloxyalkane (having 2 to 6 carbon atoms) (diallyloxyethane, triallyloxyethane, tetraallyloxybutane, and tetramethallyloxyethane, and the like)]

Aromatic vinyl ethers (having 8 to 20 carbon atoms, for example, vinyl phenyl ether and phenoxystyrene)

(b35-3) Vinyl Ketones

Aliphatic vinyl ketones (having 4 to 25 carbon atoms, for example, vinyl methyl ketone and vinyl ethyl ketone), aromatic vinyl ketones (having 9 to 21 carbon atoms, for example, vinyl phenyl ketone)

(b35-4) Unsaturated Dicarboxylic Acid Diesters

Unsaturated dicarboxylic acid diesters having 4 to 34 carbon atoms, for example, dialkyl fumarate (two alkyl groups are each a linear, branched, or alicyclic group having 1 to 22 carbon atoms) and dialkyl maleate (two alkyl groups are each a linear, branched, or alicyclic group having 1 to 22 carbon atoms)

Among those exemplified above as the monomer (b3), from the viewpoints of liquid absorption of the electrolyte solution and voltage resistance, (b31), (b32), and (b33) are preferable, and methyl (meth)acrylate, ethyl (meth)acrylate, and butyl (meth)acrylate among (b31) are more preferable.

In the polymer, the contents of the vinyl monomer (b1) having a carboxyl group, the vinyl monomer (b2) represented by General Formula (1), and the copolymerizable vinyl monomer (b3) containing no active hydrogen are preferably 0.1 to 80% by mass of (b1), 0.1 to 99.9% by mass of (b2), and 0 to 99.8% by mass of (b3), with respect to the weight of the polymer.

If the content of these monomers is within the above ranges, the liquid absorption property for an electrolyte solution is improved.

The contents of (b1) to (b3) are more preferably 30 to 60% by mass of (b1), 5 to 60% by mass of (b2), and 5 to 80% by mass of (b3), and still more preferably 35 to 50% by mass of (b1), 15 to 45% by mass of (b2), and 20 to 60% by mass of (b3).

A lower limit of the number average molecular weight of the polymer is preferably 10,000, more preferably 15,000, particularly preferably 20,000, and most preferably 30,000, and an upper limit thereof is preferably 2,000,000, more preferably 1,500,000, particularly preferably 1,000,000, and most preferably 800,000.

The number average molecular weight of the polymer can be determined by GPC (gel permeation chromatography) under the following conditions.

Device: Alliance GPC V2000 (manufactured by Waters)
Solvent: Ortho-Dichlorobenzene
Standard substance: Polystyrene
Sample concentration: 3 mg/ml
Column solid phase: Two PL gel 10 μm MIXED-B columns connected in series (manufactured by Polymer Laboratories Limited)
Column temperature: 135° C.

The solubility parameter (SP value) of the polymer is preferably 9.0 to 20.0 $(cal/cm^3)^{1/2}$. The SP value of the polymer is more preferably 9.5 to 18.0 $(cal/cm')^{1/2}$, and still more preferably 10.0 to 14.0 $(cal/cm^3)^{1/2}$. The polymer having an SP value of 9.0 to 20.0 $(cal/cm^3)^{1/2}$ is preferred in terms of liquid absorption of the electrolyte solution.

Furthermore, the glass transition point [hereinafter abbreviated as Tg; measurement method: DSC (differential scanning calorimetry] of the polymer is preferably 80 to 200° C., more preferably 90 to 190° C., and particularly preferably 100 to 180° C., from the viewpoint of the heat resistance of the battery.

The polymer can be produced by a known polymerization method (bulk polymerization, solution polymerization, emulsion polymerization, suspension polymerization, or the like)

The coating resin preferably has moderate flexibility in a state of being immersed in an electrolyte solution. Specifically, the tensile elongation at break of the coating resin in a saturated liquid absorbing state is preferably 10% or more, more preferably 20% or more, still more preferably 30% or more, particularly preferably 40% or more, and most preferably 50% or more. By coating the electrode active material with a resin having a tensile elongation at break of 10% or more, it is possible to relax a volume change of the electrode active material due to a charging and discharging reaction and to suppress expansion of the electrode. Incidentally, in the present specification, the "tensile elongation at break" is an index indicating flexibility of a resin and is a value obtained by a measuring method described in the column of Examples described later. A larger value of the tensile elongation at break of the coating resin is more preferable. An upper limit value thereof is not particularly limited, but is usually 400% or less, and preferably 300% or less. That is, a preferable range of the numerical values of the tensile elongation at break is 10 to 400%, 20 to 400%, 30 to 400%, 40 to 400%, 50 to 400%, 10 to 300%, 20 to 300%, 30 to 300%, 40 to 300%, or 50 to 300%.

Examples of a method for imparting flexibility to the coating resin and controlling the tensile elongation at break to a desired value include a method for introducing a flexible partial structure (for example, a long chain alkyl group, a polyether residue, an alkyl polycarbonate residue, an alkyl polyester residue, or the like) into the main chain of the coating resin. In addition, it is possible to adjust the tensile elongation at break by imparting flexibility to the coating resin by controlling the molecular weight of the coating resin or controlling a molecular weight between the crosslinks.

(Conductive Aid)

The conductive aid can contribute to an enhancement of the high-rate power output characteristics of the battery by forming electron conductive paths in the coating agent and reducing the electron transfer resistance of the positive electrode active material layer.

Examples of the conductive aid include metals such as aluminum, stainless steel (SUS), silver, gold, copper, and titanium; alloys or metal oxides including these metals; carbons such as graphite, carbon fibers (specifically, vapor-grown carbon fibers (VGCF) and the like), carbon nanotubes (CNT), and carbon black (specifically, acetylene black, KETJEN BLACK (registered trademark), furnace black, channel black, thermal lamp black, and the like); however, the conductive aid is not limited to these. Furthermore, a material obtained by coating the circumference of a particulate ceramic material or a resin material with the above-described metal material by plating or the like can also be used as a conductive aid. Among these conductive aids, from the viewpoint of electrical stability, it is preferable that the conductive aid include at least one selected from the group consisting of aluminum, stainless steel, silver, gold, copper, titanium, and carbon; it is more preferable that the conductive aid include at least one selected from the group consisting of aluminum, stainless steel, silver, gold, and carbon; and it is even more preferable that the conductive aid include at least one kind of carbon. Regarding these conductive aids, only one kind thereof may be used alone, or two or more kinds thereof may be used in combination.

The shape of the conductive aid is preferably a particulate form or a fiber form. In a case in which the conductive aid is in a particulate form, the shape of the particles is not particularly limited and may be any shape such as a powdery shape, a spherical shape, a rod shape, a needle shape, a plate shape, a pillar shape, an irregular shape, a scaly shape, or a spindle shape.

The average particle size (primary particle size) in the case in which the conductive aid is in a particulate form is not particularly limited; however, from the viewpoint of the electric characteristics of the battery, the average particle size is preferably about 0.01 to 10 μm. Incidentally, in the present specification, the "particle size" means the largest distance L among the distances between any arbitrary two points on the contour line of the conductive aid. Regarding the value of the "average particle size", a value calculated as an average value of the particle sizes of the particles observed in several to several dozen visual fields using an observation means such as a scanning electron microscope (SEM) or a transmission electron microscope (TEM) is to be employed.

The contents of the coating resin and the conductive aid in the coating agent are not particularly limited; however, it is preferable that coating resin (resin solid content):conductive aid=1:0.2 to 3.0 (mass ratio). When the contents are in such a range, the conductive aid in the coating agent can satisfactorily form electron conductive paths.

(Method for Producing Coated Positive Electrode Active Material Particles)

The method for producing coated positive electrode active material particles is not particularly limited; however, for example, the following method may be mentioned. First, a positive electrode active material is introduced into a universal mixing machine, and in a state of being stirred at 10 to 500 rpm, a solution including a coating resin and a solvent (coating resin solution) is added dropwise thereto over 1 to 90 minutes to mix in. Regarding the solvent at this time, an alcohol such as methanol, ethanol, or isopropanol can be suitably used. Subsequently, a conductive aid is further added thereto, and the mixture is mixed. Then, the temperature is raised to 50° C. to 200° C. while being stirred, the pressure is lowered to 0.007 to 0.04 MPa, and then the mixture is maintained for 10 to 150 minutes. Thereby, coated positive electrode active material particles can be obtained.

(Conductive Member)

According to the present aspect, the conductive member has a function of forming electron conductive paths in the positive electrode active material layer. Particularly, it is preferable that at least a portion of the conductive member form a conductive path which electrically connects from a first principal surface that is in contact with the electrolyte layer side of the positive electrode active material layer to a second principal surface that is in contact with the current collector side. By having such a form, the resistance to electron transfer in the thickness direction within the positive electrode active material layer is further reduced. As a result, the high-rate power output characteristics of the battery can be further enhanced. Incidentally, whether at least a portion of the conductive member forms a conductive path electrically connecting from a first principal surface that is in contact with the electrolyte layer side of the positive electrode active material layer to a second principal surface that is in contact with the current collector side, can be checked by observing a cross-section of the positive electrode active material layer using SEM or an optical microscope.

It is preferable that the conductive member be a conductive fiber having a fibrous form. Specifically, examples include carbon fibers such as PAN-based carbon fibers and pitch-based carbon fibers; conductive fibers obtained by uniformly dispersing a highly conductive metal or graphite in synthetic fibers; metal fibers obtained by processing a metal such as stainless steel into fibers; conductive fibers obtained by coating the surface of fibers of an organic material with a metal; conductive fibers obtained by coating the surface of fibers of an organic material with a resin including a conductive substance; and the like. Above all, carbon fibers are preferred from the viewpoint of having excellent conductivity and being lightweight.

The content of the conductive member in the positive electrode active material layer is preferably 1% to 20% by mass, and more preferably 2% to 15% by mass, with respect to 100% by mass of the total solid content of the positive electrode active material layer (sum of the quantities of solid members among the members constituting the positive electrode active material layer). When the content of the conductive member is in the above-described range, the electron conductive paths can be satisfactorily formed within the positive electrode active material layer, and also, a decrease in the energy density of the battery can be suppressed.

Incidentally, Young's modulus of the positive electrode active material layer and the negative electrode active material layer that will be described below is preferably 5 to 100 MPa.

(Ion Conductive Polymer)

Examples of the ion conductive polymer include polyethylene oxide (PEO)-based and polypropylene oxide (PPO)-based polymers.

(Lithium Salt)

Examples of the lithium salt (supporting salt) include lithium salts of inorganic acids, such as $LiPF_6$, $LiBF_4$, $LiSbF_6$, $LiAsF_6$, and $LiClO_4$; lithium salts of organic acids, such as $LiN(CF_3SO_2)_2$, $LiN(C_2F_5SO_2)_2$, and $LiC(CF_3SO_2)_3$; and the like. Above all, from the viewpoints of the battery power output and the charge-discharge cycle characteristics, $LiPF_6$ is preferred.

Incidentally, according to the present aspect, the mixing ratio of other additives such as a conductive member and a lithium salt, which can be included in the positive electrode active material layer, is not particularly limited. Such a mixing ratio can be adjusted by appropriately referring to known findings about non-aqueous electrolyte secondary batteries.

Furthermore, with regard to the non-aqueous electrolyte secondary battery according to the present aspect, in addition to the above-described positive electrode active material as a constituent member of the positive electrode active material layer, members other than a coating agent (a coating resin and a conductive aid), a conductive member, an ion conductive polymer, and a lithium salt, which are used as necessary, may be appropriately used. However, from the viewpoint of increasing the energy density of the battery, it is preferable that a member that do not much contribute to the progress of a charging and discharging reaction not be incorporated. Here, with regard to the non-aqueous electrolyte secondary battery according to the present aspect, the positive electrode active material layer (and the negative electrode active material layer that will be described below) is a so-called "non-bound body" in which the positive electrode active material (negative electrode active material) is not bound by a binder that has been crystallized by heating. Further, in order to produce an active material layer as a non-bound body, it is preferable that a binder that is added in order to bind the positive electrode active material particles and other members and maintain the structure of the positive electrode active material layer, not be used as far as possible. That is, the content of the binder in the positive electrode active material layer (negative electrode active material layer) is respectively preferably 1% by mass or less, more preferably 0.5% by mass or less, even more preferably 0.2% by mass or less, particularly preferably 0.1% by mass or less, and most preferably 0% by mass, with respect to 100% by mass of the total solid content included in the positive electrode active material layer (negative electrode active material layer). By adopting such a configuration, cracks in the active material layer and a subsequent decrease in the battery performance, which can become a problem in a dry electrode, can be prevented. Furthermore, a heating and drying step for crystallizing the binder can be omitted. Also, it is also possible to obtain a battery having a high capacity (that is, high energy density) by producing the active material layer into a thick film and omitting the binder.

With regard to the non-aqueous electrolyte secondary battery according to the present aspect, the thickness of the positive electrode active material layer is preferably 150 to 1,500 μm, more preferably 180 to 950 μm, and even more preferably 200 to 800 μm. When the thickness of the positive electrode active material layer is 150 μm or more, the energy density of the battery can be sufficiently increased. On the other hand, when the thickness of the positive electrode active material layer is 1,500 μm or less, the structure of the positive electrode active material layer can be sufficiently maintained.

Furthermore, the porosity of the positive electrode active material layer is preferably 35.0% to 50.0%, more preferably 40.0% to 49.5%, and even more preferably 42.0% to 49.0%. Furthermore, the density of the positive electrode active material layer is preferably 2.10 to 3.00 $g/cm^3$, more preferably 2.15 to 2.70 $g/cm^3$, and even more preferably 2.17 to 2.60 $g/cm^3$.

[Negative Electrode Active Material Layer]

According to the present invention, regarding the negative electrode active material layer, as long as the layer includes a negative electrode active material, embodiments other than that are not particularly limited, and conventionally known findings are appropriately referred to.

However, according to a preferred embodiment of the present invention, it is preferable that the negative electrode active material layer have embodiments similar to those of the above-mentioned positive electrode active material layer. That is, it is preferable that the negative electrode active material layer include a negative electrode active material and a coating agent that covers the surface of this negative electrode active material. In other words, it is preferable that the negative electrode active material layer include coated negative electrode active material particles in which at least a portion of the surface of the negative electrode active material is coated with a coating agent including a coating resin and a conductive aid. Furthermore, the negative electrode active material layer can include a conductive member, an ion conductive polymer, a lithium salt, and the like, as necessary.

Incidentally, in the present specification, the negative electrode active material in a state of being coated with a coating agent is also referred to as "coated negative electrode active material particles". A negative electrode active material particle has a core-shell structure in which a shell part that includes a coating agent including a coating resin and a conductive aid is formed on the surface of a core part that includes a negative electrode active material.

Incidentally, with regard to embodiments of the negative electrode active material layer including coated negative electrode active material particles, since the embodiments are basically similar to the contents described in the section of "Positive electrode active material layer" except for the material of the negative electrode active material, detailed description will not be repeated here.

(Negative Electrode Active Material)

Examples of the negative electrode active material include carbon materials such as graphite, soft carbon, and hard carbon; lithium-transition metal composite oxides (for example, $Li_4Ti_5O_{12}$), metal materials (tin and silicon), lithium alloy-based negative electrode materials (for example, a lithium tin alloy, a lithium-silicon alloy, a lithium-aluminum alloy, a lithium-aluminum-manganese alloy, and the like), and the like. Depending on cases, two or more kinds of negative electrode active materials may be used in combination. Preferably, from the viewpoints of capacity and power output characteristics, a carbon material, a lithium-transition metal composite oxide, and a lithium alloy-based negative electrode material are preferably used as the negative electrode active material. Incidentally, it is a matter of course that a negative electrode active material other than those described above may be used. Furthermore, the above-mentioned coating resin has a property of being easily attachable particularly to carbon materials. Therefore, in a case in which the negative electrode active material is in the form of a coated negative electrode active material particles, from the viewpoint of providing a structurally stable electrode material, it is preferable to use a carbon material as the negative electrode active material.

The average particle size of the negative electrode active material is not particularly limited; however, from the viewpoint of increasing the power output, the average particle size is preferably 1 to 100 μm, and more preferably 1 to 20 μm.

[Separator (Electrolyte Solution)]

In the non-aqueous electrolyte secondary battery according to the present aspect, a separator in which an electrolyte solution (liquid electrolyte) is retained is interposed between the positive electrode active material layer and the negative electrode active material layer. Incidentally, the electrolyte solution (liquid electrolyte) can be included not only in the separator but also in the positive electrode active material layer and the negative electrode active material layer.

The electrolyte solution (liquid electrolyte) has a function as a carrier of lithium ions. The electrolyte solution (liquid electrolyte) constituting the electrolyte solution layer has a form in which a lithium salt is dissolved in an organic solvent. Examples of the organic solvent to be used include carbonates such as ethylene carbonate (EC), propylene carbonate (PC), dimethyl carbonate (DMC), diethyl carbonate (DEC), and ethyl methyl carbonate. Furthermore, as the lithium salt, compounds that can be added to an active material layer of an electrode, such as $Li(C_2F_5SO_2)_2N$, $LiPF_6$, $LiBF_4$, $LiClO_4$, $LiAsF_6$, and $LiCF_3SO_3$, can be similarly employed. The liquid electrolyte may further include additives other than the above-mentioned components. Specific examples of such a compound include, for example, vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyl oxymethyl ethylene carbonate, allyl oxymethyl ethylene carbonate, acryl oxymethyl ethylene carbonate, methacryl oxymethyl ethylene carbonate, ethynyl ethylene carbonate, propargyl ethylene carbonate, ethynyl oxymethyl ethylene carbonate, propargyl oxyethylene carbonate, methylene ethylene carbonate, 1,1-dimethyl-2-methylene ethylene carbonate, and the like. Above all, vinylene carbonate, methyl vinylene carbonate, and vinyl ethylene carbonate are preferred, and vinylene carbonate and vinyl ethylene carbonate are more preferred. Regarding these cyclic carbonic acid esters, only one kind thereof may be used alone, or two or more kinds thereof may be used in combination.

The separator has a function of retaining an electrolyte and thereby securing lithium ion conductivity between a positive electrode and a negative electrode, and a function as a barrier between the positive electrode and the negative electrode.

Examples of embodiments of the separator include a separator of a porous sheet and a nonwoven fabric separator, each of which includes a polymer or fibers that absorb and retain the above-described electrolyte.

Regarding a separator of a porous sheet including a polymer or fibers, for example, a microporous (microporous film) can be used. Examples of a specific embodiment of the porous sheet including a polymer or fibers include microporous (microporous film) separators including polyolefins such as polyethylene (PE) and polypropylene (PP); a laminate body obtained by laminating a plurality of these (for example, a laminate body having a three-layer structure of PP/PE/PP, or the like), hydrocarbon-based resins such as polyimide, aramid, andpolyvinylidene fluoride-hexafluoropropylene (PVdF-HFP), glass fibers, and the like.

The thickness of the microporous (microporous film) separator cannot be uniformly defined, since the thickness varies depending on the use application. For instance, it is desirable that the thickness of the separator in applications such as motor driving secondary batteries for electric vehicles (EV), hybrid electric vehicles (HEV), fuel cell vehicles (FCV), and the like is 4 to 60 μm as a single layer or a multilayer. It is desired that the pore diameter of the microporous (microporous film) separator is 1 μm or less at the maximum (usually, a pore diameter of about several dozen nm).

Examples of the nonwoven fabric separator include nonwoven fabrics that use conventionally known materials such as cotton, rayon, acetate, nylon, polyester; polyolefins such as PP and PE; polyimide, and aramid, singly or as mixtures. Furthermore, the apparent density of the nonwoven fabric may be any value with which satisfying battery characteristics are obtained by the polymer gel electrolyte impregnated therein, and should not be particularly limited. Furthermore, the thickness of the nonwoven fabric separator may be the same as that of the electrolyte layer, and the thickness is preferably 5 to 200 μm, and particularly preferably 10 to 100 μm.

Furthermore, it is also preferable to use, as a separator, a product in which the above-mentioned microporous (microporous film) separator or a nonwoven fabric separator is used as a resin porous substrate layer, and a heat resistant insulating layer is laminated on this (heat resistant insulating layer-attached separator). The heat resistant insulating layer is a ceramic layer including inorganic particles and a binder. Regarding the heat resistant insulating layer-attached separator, a highly heat-resistant separator having a melting point or a thermal softening point of 150° C. or higher, and preferably 200° C. or higher, is used. By having a heat resistant insulating layer, the internal stress of the separator that increases at the time of temperature increase is relaxed, and therefore, an effect of suppressing thermal shrinkage can be obtained. As a result, induction of a short circuit between the electrodes of a battery can be prevented, and therefore, a battery configuration by which deterioration of the performance caused by temperature increase is not likely to occur is obtained. Furthermore, by having a heat resistant insulating layer, the mechanical strength of the heat resistant insulating layer-attached separator is increased, and film breakage of the separator does not easily occur. Moreover, from the viewpoint of the effect of suppressing thermal shrinkage and the high mechanical strength, the separator is not likely to curl during the production process for a battery.

The inorganic particles in the heat resistant insulating layer contribute to the mechanical strength and the effect of suppressing thermal shrinkage of the heat resistant insulating layer. The material used for the inorganic particles is not particularly limited. Examples include oxides of silicon, aluminum, zirconium, and titanium ($SiO_2$, $Al_2O_3$, $ZrO_2$, and $TiO_2$), hydroxides and nitrides, and composite bodies of these. These inorganic particles may be particles originating from mineral resources such as boehmite, zeolite, apatite, kaolin, mullite, spinel, olivine, and mica, or may be artificially produced particles. Furthermore, regarding these inorganic particles, only one kind thereof may be used alone, or two or more kinds thereof may be used in combination. Among these, from the viewpoint of cost, it is preferable to use silica ($SiO_2$) or alumina ($Al_2O_3$), and it is more preferable to use alumina ($Al_2O_3$).

The basis weight of the inorganic particles is not particularly limited; however, the basis weight is preferably 5 to 15 g/m$^2$. When the basis weight is in this range, sufficient ion conductivity is obtained, and also, it is preferable from the viewpoint of maintaining the heat-resistant strength.

A binder in the heat resistant insulating layer plays a role of adhering the inorganic particles with other inorganic particles or adhering the inorganic particles with the resin porous substrate layer. The heat resistant insulating layer is stably formed by this binder, and peeling between the resin porous substrate layer and the heat resistant insulating layer is prevented.

The binder that is used for the heat resistant insulating layer is not particularly limited, and for example, compounds such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), and methyl acrylate can be used as the binder. Among these, it is preferable to use carboxymethyl cellulose (CMC), methyl acrylate, or polyvinylidene fluoride (PVDF). Regarding these compounds, only one kind thereof may be used alone, or two or more kinds thereof may be used in combination.

The content of the binder in the heat resistant insulating layer is preferably 2% to 20% by mass with respect to 100% by mass of the heat resistant insulating layer. When the content of the binder is 2% by mass or more, the peeling strength between the heat resistant insulating layer and the resin porous substrate layer can be increased, and the vibration resistance of the separator can be increased. On the other hand, when the content of the binder is 20% by mass or less, since gaps between the inorganic particles are appropriately maintained, sufficient lithium ion conductivity can be secured.

The thermal shrinkage ratio of the heat resistant insulating layer-attached separator is preferably 10% or less in both MD and TD after storage for one hour under the conditions of 150° C. and 2 gf/cm$^2$. By using such a highly heat-resistant material, the amount of heat generation becomes large, and even when the battery internal temperature reaches 150° C., shrinkage of the separator can be effectively prevented. As a result, induction of a short circuit between the electrodes of the battery can be prevented, and therefore, a battery configuration in which deterioration of the performance caused by temperature increase does not easily occur is obtained.

[Positive Electrode Current Collecting Plate and Negative Electrode Current Collecting Plate]

The material that constitutes current collecting plates (25, 27) is not particularly limited, and any known highly conductive material that has been conventionally used as a current collecting plate for a lithium ion secondary battery can be used. Regarding the constituent material of the current collecting plate, for example, metal materials such as aluminum, copper, titanium, nickel, stainless steel (SUS), and alloys of these are preferred. From the viewpoints of light weight, corrosion resistance, and high electrical conductivity, more preferred are aluminum and copper, and particularly preferred is aluminum. Incidentally, for the positive electrode current collecting plate 25 and the negative electrode current collecting plate 27, the same material may be used, or different materials may be used.

[Positive Electrode Lead and Negative Electrode Lead]

Furthermore, although not illustrated in the diagram, a current collector 11 and a current collecting plate (25, 27) may be electrically connected by means of a positive electrode lead or a negative electrode lead. Regarding the constituent material for the positive electrode and negative electrode leads, any known material that is used for lithium ion secondary batteries can be similarly employed. Meanwhile, it is preferable that the portion pulled out from the outer casing be coated with a thermally shrinkable tube or the like having heat-resistant insulating properties, so that the portion is prevented from coming into contact with peripheral apparatuses, wiring, and the like, causing a short-circuit, and thereby affecting the manufactured product (for example, automotive parts, particularly electronic apparatuses, and the like).

[Seal Part]

A seal part (insulating layer) is a constituent member characteristic to the bipolar non-aqueous electrolyte secondary battery illustrated in FIG. 1 and has a function of preventing contact between current collectors or a short circuit at the terminal of a single battery layer. The material that constitutes the seal part may be a material having insulating properties, sealability against exfoliation of the solid electrolyte or sealability (encapsulating properties) against the permeation of moisture from the outside, heat resistance at the battery operation temperature, and the like. For example, an acrylic resin, a urethane resin, an epoxy resin, a polyethylene resin, a polypropylene resin, a polyimide resin, rubber (ethylene-propylene-diene rubber: EPDM), and the like can be used. Furthermore, an isocyanate-based adhesive, an acrylic resin-based adhesive, a cyanoacrylate-based adhesive, and the like may also be used, and a hot melt adhesive (a urethane resin, a polyamide resin, a polyolefin resin) and the like may be used. Above all, from the viewpoints of corrosion resistance, chemical resistance, easy manufacturability (film-forming properties), economic efficiency, and the like, a polyethylene resin or a polypropylene resin is preferably used as a constituent material of the insulating layer, and it is preferable to use a resin that has a non-crystalline polypropylene resin as a main component and is copolymerized with ethylene, propylene, and butene.

[Outer Casing Body]

As the outer casing body, a bag-shaped case using a laminate film 29 including aluminum, which can cover the power generating elements as illustrated in FIG. 1, can be used. Regarding the laminate film, for example, a laminate film having a three-layer structure in which PP, aluminum, and nylon are laminated in this order, or the like can be used; however, the laminate film is not limited to these. From the viewpoint that the force of pressurization applied by pressurizing members can be easily transferred to the power generating elements, it is preferable that the outer casing body be constructed from a material that does not have rigidity. Above all, from the viewpoint that the material is excellent in terms of high power output and cooling performance and can be suitably utilized in batteries for large-sized apparatuses such as EV and HEV, a laminate film is preferred, and a laminate film including aluminum is particularly preferred.

Since the bipolar lithium ion secondary battery of the present aspect has a configuration as described above, the decrease in the energy density of the battery is suppressed to a minimal level, the internal resistance of the battery is decreased, and the cycle characteristics are enhanced. Therefore, the non-aqueous electrolyte secondary battery according to the present aspect is suitably used as a power supply for driving EVs and HEVs.

The lithium ion secondary battery according to the present aspect is not limited to the bipolar lithium ion secondary battery explained with reference to FIG. 1 and can also be applied to any arbitrary conventionally known lithium ion secondary battery such as a so-called parallel laminate type battery of the type in which single battery layers are connected in parallel in a power generating element. Incidentally, in a parallel laminate type battery, the disposition of a seal part (insulating layer) is unnecessary.

Figure 5:
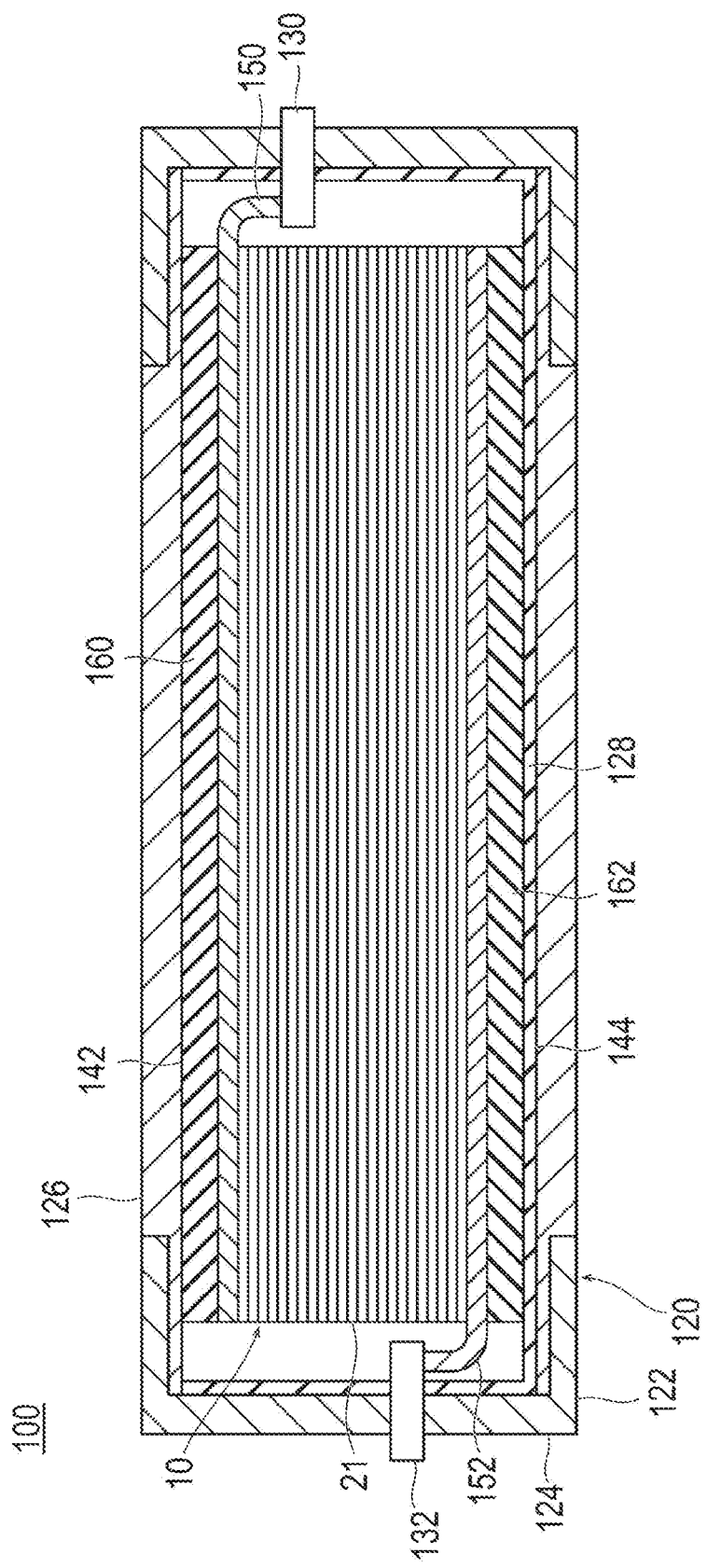
FIG. 5 is a schematic cross-sectional view for explaining another embodiment of the battery device according to the present aspect.

FIG. 5 is a schematic cross-sectional view for explaining another embodiment of the battery device according to the present aspect.

In the battery device according to the embodiment illustrated in the above-mentioned FIG. 1 to FIG. 3, a non-aqueous electrolyte secondary battery 10 encapsulated by a laminate film 29, which is an outer casing body constructed from a material that does not have rigidity is interposed between metal plates 200 that constitute a pressurizing member. Further, the power generating element 21 of the non-aqueous electrolyte secondary battery 10 is pressurized in the direction of lamination thereof by the fastening force of fastening members (bolts 300 and nuts 400).

In contrast, in the battery device according to the embodiment illustrated in FIG. 5, an outer casing body (laminate film) constructed from a material that does not have rigidity is not used. Instead, the battery device has a configuration in which a bipolar lithium ion secondary battery 10 including a power generating element 21 inside a cell case 120 formed from a material having rigidity is accommodated. Thereby, the cell case 120 accomplishes the function as an outer casing body and also functions as a pressurizing member.

More particularly, according to the embodiment illustrated in FIG. 5, the cell case 120 is formed from a highly rigid material and has an approximately rectangular-shaped bottom face 122, a side wall part 124 surrounding the bottom face 122, and an approximately rectangular-shaped top face 126. The side wall part 124 is configured to be attachable to the bottom face 122 and the top face 126 by fastening members that are not illustrated in the drawings. While in a state in which the side wall part 124 is attached to the bottom face 122 and the top face 126, the cell case 120 constitutes a closed shape. Inside the cell case 120, the bipolar lithium ion secondary battery 10 including the power generating element 21 is disposed.

The bipolar lithium ion secondary battery 10 has a power generating element 21, in each of which a positive electrode, a negative electrode, and a separator are laminated; current collecting plates 150 and 152; and spacers 160 and 162. The top face 126 of the cell case 120 is positioned so as to be confronted with the top face 142 of the power generating element 21 in relation to the direction of lamination of the power generating element 21.

The current collecting plates 150 and 152 are, for example, approximately plate-shaped copper and are used in order to extract electric current from the power generating element 21, and the current collecting plates are in contact with the single battery layer located in the lowermost layer and the single battery layer located in the uppermost layer.

The spacers 160 and 162 are insulating sheets having a function of absorbing the vibration exerted on the power generating element 21 and are disposed on the outer side in the direction of lamination of the current collecting plates 150 and 152. That is, the spacers 160 and 162 are located at the top face (one face) 142 and the lower face (the other face) 144 of the power generating element 21. The spacers 160 and 162 can also be appropriately omitted according to necessity.

Furthermore, the cell case 120 further has an insulating film layer 128 and connectors for power electrics 130 and 132. The insulating film layer 128 is formed on the bottom face 122 and the inner wall of the side wall part 124. On the insulating film layer 128 of the bottom face 122, the spacer 162 is positioned. The connectors for power electrics 130 and 132 are attached to the side wall part 124 in an air-tight fashion and are electrically connected to the current collecting plates 150 and 152.

In the battery device 100 according to the embodiment illustrated in FIG. 5, the cell case 120 constitutes a pressurizing member together with fastening members that are not illustrated in the drawings. The power generating element 21 is pressurized in the direction of lamination thereof by these pressurizing members. As a result, as illustrated in FIG. 4, the thickness of the power generating element 21 has a variation in the planar direction, and thus the battery device 100 including the bipolar lithium ion secondary battery satisfies the above-mentioned Mathematical Formula (1).

Incidentally, also for the embodiment illustrated in FIG. 5, there are no particular limitations on the specific technique for configuring the battery device so as to satisfy the above-mentioned Mathematical Formula (1) to Mathematical Formula (3), and in the case of controlling the form of disposition of the pressurizing member or using fastening members, a battery device that satisfies the above-described mathematical formulae can be obtained by regulating the fastening force of the members.

Furthermore, in the embodiment illustrated in FIG. 5, the size of the side wall part 124 (size in the vertical direction illustrated in FIG. 5) of the cell case 120 is designed to be slightly small, and this may be fitted to the top face 126 and the bottom face of the cell case. By adopting such a configuration, it is possible to apply a force of pressurization larger than the force of pressurization applied at the central portion with respect to the outer peripheral portion in a case in which the power generating element 21 is viewed in planar view. In this manner, the thickness of the power generating element 21 is varied in the planar direction, and thereby the battery device 100 may be made to satisfy the above-mentioned Mathematical Formula (1).

In the above description, the variation of the thickness in the direction of lamination of the power generating element 21 has been explained by taking the case in which the thickness in the outer peripheral portion when the power generating element 21 is viewed in planar view is the minimum (T2 illustrated in FIG. 4) and the thickness at the central portion is the maximum (T1 illustrated in FIG. 4), as an example. However, the present invention is not limited to such a case, and an embodiment in which the sites where the thickness of the power generating element 21 becomes the minimum or the maximum are not the outer peripheral portion and the central portion, respectively, in the case in which the power generating element 21 is viewed in planar view, can also be employed. For example, the thickness at the central portion in the case in which the power generating element 21 is viewed in planar view may be the minimum, and the thickness at the outer peripheral portion may be the maximum. Such an embodiment can be achieved, for example, when a battery device is mounted in a vehicle, by providing protruding parts on a member that is adjacent to the battery device, and disposing the member such that the protruding parts come into contact with the central portion of the power generating element 21 and thereby exert a larger force of pressurization to the central portion of the power generating elements.

In common electric vehicles, the battery storage space is about 170 L. In order to store a cell and auxiliary machines such as a charge-discharge control apparatus in this space, the storage space efficiency of a cell is usually about 50%. The loading efficiency of the cell into this space becomes a factor that dominates the cruising distance of an electric vehicle. When the size of a single cell becomes small, the loading efficiency is impaired, and therefore, the cruising distance cannot be secured.

Therefore, it is preferable that the non-aqueous electrolyte secondary battery that constitutes the battery device according to the present invention be large-sized. Specifically, it is preferable that the length of a short side of a flat laminate type non-aqueous electrolyte laminate secondary battery be 100 mm or more. Such a large-sized battery can be used for vehicle use. Here, the length of a short side of a laminate battery refers to the side having the shortest length. The upper limit of the length of the short side is not particularly limited; however, the upper limit is usually 400 mm or less.

[Volume Energy Density and Rated Discharge Capacity]

In common electric vehicles, it is an important development objective to determine how the long travel distance (cruising distance) should be made by one-time charging. When such a point is taken into consideration, the volume energy density of the battery is preferably 157 Wh/L or higher, while the rated capacity is preferably 20 Wh or higher.

Furthermore, from the viewpoint of a large-sized battery, which is different from the viewpoint of the physical size of electrodes, the increase in size of a battery can be defined from the relationship of the battery area and the battery capacity. For example, in the case of a flat laminate type laminate battery, it is preferable that the present invention be applied to a battery for which the value of the ratio of the battery area (projected area of the battery including the outer casing body) to the rated capacity is 5 $cm^2$/Ah or greater, and the rated capacity is 3 Ah or higher. Furthermore, the aspect ratio of a rectangular-shaped electrode is preferably 1 to 3, and more preferably 1 to 2. Incidentally, the aspect ratio of an electrode is defined as the longitudinal-lateral ratio of a rectangular-shaped positive electrode active material layer. When the aspect ratio is adjusted to such a range, there is an advantage that the required vehicle performance and the mounting space can be achieved in a well-balanced manner.

[Assembled Battery]

An assembled battery is configured by connecting a plurality of batteries. More particularly, an assembled battery is configured by using at least two or more batteries arranged to be in series or in parallel, or in both. By arranging batteries in series or in parallel, the capacity and the voltage can be freely regulated.

A plurality of batteries can be connected in series or in parallel, and thereby a small-sized attachable or detachable assembled battery can be formed. Further, by connecting a plurality of these small-sized attachable or detachable assembled batteries in series or in parallel, an assembled battery having a large capacity and a large power output appropriate for a vehicle driving power supply or an auxiliary power supply, where a high volume energy density and a high volume power output density are required, can also be formed. How many batteries should be connected to produce an assembled battery, and how many levels small-sized assembled batteries should be laminated to produce a large-capacity assembled battery may be determined according to the battery capacity and power output of the vehicle (electric vehicle) in which the assembled battery is mounted.

[Vehicle]

The battery device of the present aspect maintains the discharge capacity even after long-term use, and the cycle characteristics are satisfactory. Furthermore, the energy density is high. With regard to the vehicle applications such as an electric vehicle, a hybrid electric vehicle, a fuel cell vehicle, and a hybrid fuel cell vehicle, high capacity and increase in size are required compared to the electric apparatus and portable electronic apparatus applications, and an increase in the lifetime is needed. Therefore, the non-aqueous electrolyte secondary battery can be suitably utilized as a power supply for vehicles, for example, as a vehicle driving power supply or an auxiliary power supply.

Specifically, a battery or an assembled battery obtained by combining a plurality of these batteries can be mounted in a vehicle. In the present invention, since a long-life battery having excellent long-term reliability and power output characteristics can be constructed, when such a battery is mounted, a plug-in hybrid electric vehicle having a long EV travel distance or an electric vehicle having a long one-time charge travel distance can be constructed. It is because when a battery or an assembled battery obtained by combining a plurality of these batteries is used for cars, for example, hybrid cars, fuel cell cars, and electric vehicles (including all four-wheeled cars (a passenger car, commercial cars such as a truck and a bus, a light vehicle, and the like), as well as two-wheeled cars (motorbikes) and three-wheeled cars), and long-life vehicles with high reliability are obtained. However, the use application is not limited to vehicles, and it is also possible to apply the battery and assembled battery to various power supplies for other vehicles, for example, moving bodies such as electric trains, while it is also possible to utilize the battery and assembled battery as power supplies for mounting in UPS devices and the like.

EXAMPLES

Hereinafter, the present invention will be described in more detail by way of Examples. However, the technical scope of the present invention is not intended to be limited only to the following Examples. Meanwhile, unless particularly stated otherwise, the unit "parts" means "parts by mass". Furthermore, the processes including from the preparation of a slurry for a positive electrode active material layer and a slurry for a negative electrode active material layer to the production of a lithium ion secondary battery were carried out in a dry room.

<<Production of Lithium Ion Secondary Battery>>

Example 1

<Production of Negative Electrode Active Material Coating Resin Solution>

Into a four-necked flask equipped with a stirrer, a thermometer, a reflux cooling tube, a dropping funnel, and a nitrogen gas inlet tube, 83 parts of ethyl acetate and 17 parts of methanol were introduced, and the temperature was raised to 68° C.

Next, a monomer blend liquid obtained by blending 242.8 parts of methacrylic acid, 97.1 parts of methyl methacrylate, 242.8 parts of 2-ethylhexyl methacrylate, 52.1 parts of ethyl acetate, and 10.7 parts of methanol, and an initiator solution obtained by dissolving 0.263 parts of 2,2'-azobis(2,4-dimethylvaleronitrile) in 34.2 parts of ethyl acetate were continuously added dropwise into the four-necked flask, with stirring, using a dropping funnel for 4 hours while nitrogen was blown into the flask, and thus radical polymerization was carried out. After completion of the dropwise addition, an initiator solution obtained by dissolving 0.583 parts of 2,2'-azobis(2,4-dimethylvaleronitrile) in 26 parts of ethyl acetate was continuously added thereto using a dropping funnel for 2 hours. Furthermore, polymerization was continued for 4 hours at the boiling point. The solvent was removed, 582 parts of a resin was obtained, subsequently 1,360 parts of isopropanol was added thereto, and thereby a negative electrode active material coating resin solution including a vinyl resin at a resin solid content concentration of 30% by mass was obtained.

<Production of Coated Negative Electrode Active Material>

88.4 parts of hardly graphitizable carbon (hard carbon) (manufactured by Kureha Battery Materials Japan Co., Ltd., CARBOTRON (registered trademark) PS(F)) was introduced into a universal mixing machine, and in a state of being stirred at 150 rpm at room temperature, the negative electrode active material coating resin solution (resin concentration 30% by mass) obtained as described above was added dropwise thereto for 60 minutes so as to obtain a resin solid content of 10 parts. The mixture was mixed and was further stirred for 30 minutes.

Next, in a state of being stirred, 1.6 parts of acetylene black [manufactured by Denka Co., Ltd., DENKA BLACK (registered trademark)] was mixed in three divided portions, and while having been stirred for 30 minutes, the mixture was heated to 70° C. The pressure was lowered to 0.01 MPa, the mixture was maintained for 30 minutes, and a coated negative electrode active material was obtained. Incidentally, if it was considered that the coated negative electrode active material had a core-shell structure, the average particle size of the hardly graphitizable carbon powder as a core was 9 μm. Furthermore, the solid content of the conductive aid with respect to 100% by mass of the coated negative electrode active material was 1.6% by mass.

<Production of Coated Positive Electrode Active Material>

140.0 parts of lithium nickel aluminum cobalt oxide (NCA) (manufactured by BASF TODA Battery Materials LLC) was introduced into a universal mixing machine, and in a state of being stirred at 15 m/s at room temperature, a solution obtained by adding 14.6 parts of dimethylformamide to 0.48 parts of the positive electrode active material coating resin solution (resin solid content concentration 30% by mass) obtained as described above and mixing was added dropwise for 3 minutes. The mixture was mixed and was further stirred for 5 minutes.

Next, in a state of being stirred, 8.6 parts of acetylene black [manufactured by Denka Co., Ltd., DENKA BLACK (registered trademark)] was mixed, and while having been stirred for 60 minutes, the mixture was heated to 140° C. The pressure was lowered to 0.01 MPa, the mixture was maintained for 5 hours, and a coated positive electrode active material was obtained. Incidentally, if it was considered that the coated positive electrode active material had a core-shell structure, the average particle size of the lithium nickel aluminum cobalt oxide powder as a core was 6 μm. Furthermore, the solid content of the conductive aid with respect to 100% by mass of the coated positive electrode active material was 0.1% by mass.

<Preparation of Electrolyte Solution>

In a mixed solvent (volume ratio 1:1) of ethylene carbonate (EC) and propylene carbonate (PC), Li[(FSO$_2$)$_2$N] (LiFSI) was dissolved at a proportion of 2 mol/L, and thereby obtaining an electrolyte solution.

<Preparation of Negative Electrode Active Material Slurry>

From the coated negative electrode active material obtained as described above, 616 parts of particles having an average particle size (D50) of 20 μm were apportioned, and 264 parts of particles having an average particle size (D50) of 5 μm were apportioned. To this, 76.5 parts of carbon fibers (manufactured by Osaka Gas Chemicals Co., Ltd., DONACARBO Milled S-243: average fiber length 500 μm, average fiber diameter 13 μm: electrical conductivity 200 mS/cm) as a conductive member were added, the mixture was dried for 16 hours at 120° C. under a reduced pressure of 100 mmHg, and thus removal of contained moisture was carried out.

Next, in a dry room, 637.7 parts of the electrolyte solution obtained as described above was added to the material that had been dried as described above. This mixture was stirred for 30 minutes using a mixing and stirring machine (manufactured by Dalton Corporation, 5DM-r type (planetary mixer)) at a speed of rotation for rotating: 63 rpm and revolving: 107 rpm, and thereby thick pasting was carried out.

Subsequently, 638.9 g of the electrolyte solution obtained as described above was further added thereto, the mixture was stirred for 10 minutes×3 times using a mixing and stirring machine similar to that described above, at a speed of rotation for rotating: 63 rpm and revolving: 107 rpm, and thereby thick pasting was carried out. As such, a negative electrode active material slurry was obtained. Incidentally, the solid content concentration of the negative electrode active material slurry obtained as such was 41% by mass.

<Preparation of Positive Electrode Active Material Slurry>

To 1,543.5 parts of the coated positive electrode active material obtained as described above, 31.5 parts of carbon fibers (manufactured by Osaka Gas Chemicals Co., Ltd., DONACARBO Milled S-243: average fiber length 500 μm, average fiber diameter 13 μm: electrical conductivity 200 mS/cm) as a conductive member were added, the mixture was dried for 16 hours at 120° C. under a reduced pressure of 100 mmHg, and thus removal of contained moisture was carried out.

Next, in a dry room, 393.8 parts of the electrolyte solution obtained as described above was added to the material that had been dried as described above. This mixture was stirred for 30 minutes using a mixing and stirring machine (manufactured by Dalton Corporation, 5DM-r type (planetary mixer)) at a speed of rotation for rotating: 63 rpm and revolving: 107 rpm, and thereby thick pasting was carried out.

Subsequently, 417.6 parts of the electrolyte solution was further added to the mixture obtained as described above, the mixture was stirred for 10 minutes×3 times using a mixing and stirring machine similar to that described above, at a speed of rotation for rotating: 63 rpm and revolving: 107 rpm, and thereby stirring and dilution was carried out. As such, a positive electrode active material slurry was obtained. Incidentally, the solid content concentration of the positive electrode active material slurry obtained as such was 66% by mass.

<Production of Resin Current Collector>

Using a twin-screw extruder, 75% by mass of polypropylene [trade name "SUNALLOMER (registered trademark) PL500A", manufactured by SunAllomer, Ltd.] (B-1), 20% by mass of acetylene black (AB) (DENKA BLACK (registered trademark)), and 5% by mass of a modified polyolefin resin (UMEX (registered trademark) 1001 manufactured by Sanyo Chemical Industries, Ltd.) as a dispersant (A) for a resin current collector were melt kneaded under the conditions of 180° C., 100 rpm, and a retention time of 10 minutes, and thus a material for a resin current collector was obtained. The material for a resin current collector thus obtained was extrusion molded, and thereby a resin current collector (20% AB-PP) having a thickness of 90 μm was obtained.

<Production of Electrode>

The negative electrode active material slurry obtained as described above was applied on one surface of the resin current collector obtained as described above, and thereby a negative electrode active material layer (size of applied part was 192 mm×236 mm) was formed. Next, a separator (manufactured by Celgard, LLC, #3501, thickness 25 μm, size 196 mm×240 mm) was disposed on the exposed surface of this negative electrode active material layer. The positive electrode active material slurry obtained as described above was applied on a surface of this separator, thereby a positive electrode active material layer (size of applied part was 188 mm×232 mm) was formed, and the resin current collector obtained as described above was disposed on the exposed surface of this positive electrode active material layer. This operation was repeated, and a power generating element in which 96 layers of single battery layers were laminated in series was obtained. Then, a lead-attached positive electrode current collecting plate (aluminum foil) was disposed on a surface of the resin current collector on the positive electrode side, a lead-attached negative electrode current collector (copper foil) was disposed on a surface of the resin current collector on the negative electrode side, and thus a laminate body was produced. At this time, between the periphery of the resin current collector of the positive electrode and the periphery of the resin current collector of the negative electrode, a seal part 31 was disposed as illustrated in FIG. 1. This seal part 31 was formed using a frame material of polyethylene naphthalate (PEN) by means of a heat seal fill. The laminate body obtained as such was accommodated inside a battery pack including a laminate sheet such that the leads were pulled out to the outside, the laminate body was encapsulated in a vacuum, and thereby a flat laminate type bipolar lithium ion secondary battery was produced.

<Production of Battery Device by Disposition of Pressurizing Members>

An iron plate having a thickness of 5 to 15 mm was disposed on both surfaces of the bipolar lithium ion secondary battery produced as described above, the four corners of these iron plates (corresponding to the metal plates 200) were fastened using bolts 300 and nuts 400 as illustrated in FIG. 2 and FIG. 3, and thereby a battery device was produced. At this time, between one of the iron plates and the laminate sheet of the bipolar lithium ion secondary battery, a sensor sheet of a film type pressure distribution measurement system, I-SCAN (registered trademark) (manufactured by Nitta Corporation) was disposed.

Examples 2 to 6 and Comparative Examples 1 to 4

Battery devices of Examples 2 to 6 and Comparative Examples 1 to 4 were produced by a technique similar to Examples as described above, except that the value of (T1−T2)/T1×100 was changed to the values indicated in the following Table 1 by changing the configuration (thickness of plates and the fastening force) of the pressurizing member.

<Evaluation of Battery Device>

For the battery devices of various Examples and Comparative Examples obtained as described above, the value of the minimum value (lowest load) in the planar direction of a load applied to the power generating element was measured by the film type pressure distribution measurement system. Furthermore, the thickness (T1) of the thickest portion and the thickness (T2) of the thinnest portion in the direction of lamination of the power generating element in a battery device were measured using a industrial X-ray CT apparatus, and the value of (T1−T2)/T1×100 was calculated. These results are presented in the following Table 1.

Furthermore, the value of internal resistance of the battery device, and the capacity retention rate at the time of 200-cycle charging and discharging, which is an index for cycle durability, were measured. These results are also presented in the following Table 1.

[Measurement of DCR (Direct Current Resistance)]

Under the conditions of 25° C., a battery mounted in a battery device was subjected to constant current-constant voltage charging at 0.1 C up to an upper limit voltage of 3.62 V (state of charge (SOC) was about 50%) (condition for termination: the current value was less than 0.01 C in a constant voltage mode). Subsequently, constant current discharge at 0.1 C was carried out for 30 seconds. Then, the DCR (Direct Current Resistance) was measured based on the following formula, using the cell voltage (V1) immediately before the initiation of discharge and the cell voltage (V2) after 10 seconds of discharge in the process of constant current discharge.

[Mathematical Formula 6]

$$DCR=(V1-V2)/I \times S$$

I: Current value at the time of discharge
S: Area of electrode

[Measurement of Capacity Retention Rate after 100 Cycles]

Under the conditions of 45° C., a battery mounted in a battery device was subjected to constant current-constant voltage (CC-CV) charging up to 4.2 V with a current of 0.5 C (condition for termination: the current value was less than 0.1 C in a CV mode).

Subsequently, the charging and discharging process of discharging to 2.5 V with a current of 0.5 C was repeated 100 times, by taking a rest of 10 minutes between the processes. The percentage of the discharge capacity of the 100$^{th}$ cycle with respect to the discharge capacity of the first cycle was calculated, and thereby the capacity retention rate after 100 cycles was determined.

TABLE 1

|  | (T1 − T2)/ T1 × 100 | Lowest load [kPa] | Energy density [Wh/kg] | DCR [Ωcm$^2$] | Capacity retention rate [%] |
|---|---|---|---|---|---|
| Comparative Example 1 | 0.09 | 197 | 79 | 12.0 | 93.0 |
| Comparative Example 2 | 0.07 | 46 | 101 | 12.5 | 92.4 |
| Comparative Example 3 | 0.09 | 379 | 69 | 11.5 | 94.0 |
| Comparative Example 4 | 5.45 | 199 | 145 | N.D. | N.D. |
| Example 1 | 0.89 | 202 | 115 | 11.5 | 93.3 |
| Example 2 | 0.66 | 42 | 134 | 12.0 | 93.0 |
| Example 3 | 0.90 | 205 | 110 | 11.6 | 93.7 |
| Example 4 | 2.76 | 287 | 132 | 11.8 | 93.2 |
| Example 5 | 0.47 | 55 | 126 | 12.4 | 92.5 |
| Example 6 | 0.33 | 24 | 132 | 12.2 | 92.8 |

As can be seen from the results shown in Table 1, it can be seen that by using the battery device according to the present invention, the internal resistance of a battery can be lowered, and the cycle characteristics can be enhanced, even without uniformly applying a large force of pressurization to power generating elements (that is, even without disposing large-sized pressurizing members that bring a decrease in the energy density).

The present application is based on Japanese Patent Application No. 2018-105977, filed Jun. 1, 2018, the disclosure of which is incorporated herein in its entirety by reference.

REFERENCE SIGNS LIST

11 Current collector
11a Outermost layer current collector on positive electrode side
11b Outermost layer current collector on negative electrode side
13 Positive electrode active material layer
15 Negative electrode active material layer
17 Electrolyte layer
19 Single battery layer
21 Power generating element
23 Bipolar electrode
25 Positive electrode current collecting plate (positive electrode tab)
27 Negative electrode current collecting plate (negative electrode tab)
29 Outer casing body
31 Seal part (insulating layer)
58 Positive electrode tab
59 Negative electrode tab
100 Battery device
120 Cell case
122 Bottom face of cell case
124 Side wall part
126 Top face of cell case
128 Insulating film layer
130, 132 Connector for power electrics
142 Top face of power generating element
144 Lower face of power generating element
150, 152 Current collecting plate
160, 162 Spacer

The invention claimed is:

1. A battery device comprising:
a non-aqueous electrolyte secondary battery that includes power generating elements, each power generating element including
a positive electrode in which a positive electrode active material layer that includes a non-bound body including a positive electrode active material is formed on a surface of a positive electrode current collector,
a negative electrode in which a negative electrode active material layer that includes a non-bound body including a negative electrode active material is formed on a surface of a negative electrode current collector;
a separator in which an electrolyte solution is retained; and
pressurizing members that pressurize the power generating elements in a direction of lamination thereof,
wherein when a thickness of a thickest portion in the direction of lamination of the power generating elements is designated as T1, and a thickness of a thinnest portion is designated as T2, the battery device satisfies the following Mathematical Formula (1):

$$0.1<(T1-T2)/T1 \times 100<5$$

and the T1 represents a thickness of a center part in a case in which the power generating elements are viewed in planar view, and
wherein a minimum value of a force of pressurization in the direction of lamination of each of the power generating elements is 200 kPa or greater.

2. The battery device according to claim 1, further satisfying the following Mathematical Formula (2):

$$0.3<(T1-T2)/T1 \times 100<3.$$

3. The battery device according to claim 1, wherein the non-aqueous electrolyte secondary battery is a flat laminate type laminate battery.

* * * * *